(12) United States Patent
Takeda et al.

(10) Patent No.: US 11,317,390 B2
(45) Date of Patent: Apr. 26, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/347,379

(22) PCT Filed: Nov. 1, 2017

(86) PCT No.: PCT/JP2017/039627
§ 371 (c)(1),
(2) Date: May 3, 2019

(87) PCT Pub. No.: WO2018/084212
PCT Pub. Date: May 11, 2018

(65) Prior Publication Data
US 2020/0267695 A1    Aug. 20, 2020

(30) Foreign Application Priority Data

Nov. 4, 2016  (JP) .............................. JP2016-216718

(51) Int. Cl.
*H04W 72/04* (2009.01)
(52) U.S. Cl.
CPC ................................. *H04W 72/042* (2013.01)
(58) Field of Classification Search
None
See application file for complete search history.

(56) References Cited

U.S. PATENT DOCUMENTS

| 2016/0072617 | A1  | 3/2016  | Nagata et al. |
| 2018/0124829 | A1  | 5/2018  | Lee et al. |
| 2018/0359068 | A1* | 12/2018 | Kim ................. H04W 72/0406 |
| 2019/0132837 | A1* | 5/2019  | Yl ...................... H04W 72/0413 |

(Continued)

FOREIGN PATENT DOCUMENTS

| WO | 2016-133106 A1 | 8/2016 |
| WO | 2016/175631 A1 | 11/2016 |
| WO | 2017/183912 A1 | 10/2017 |

OTHER PUBLICATIONS

U.S. Appl. No. 62/324,874, filed Apr. 2016, Yl, Yunjung.*

(Continued)

*Primary Examiner* — Kouroush Mohebbi
(74) *Attorney, Agent, or Firm* — Osha Bergman Watanabe & Burton LLP

(57) ABSTRACT

When communication is performed by using a plurality of cells (CCs) for DL and/or UL transmission, communication is controlled by appropriately using a reduced TTI and/or a reduced processing time. A user terminal that performs communication by using a plurality of cells for DL transmission and/or UL transmission includes: a reception section that receives a DL signal; and a control section that controls transmission of a UL signal at a predetermined timing based on the DL signal, and the control section controls the predetermined timing based on at least the number of cells used for the UL transmission.

5 Claims, 14 Drawing Sheets

(56) References Cited

U.S. PATENT DOCUMENTS

2019/0199484 A1 6/2019 Uchino et al.

OTHER PUBLICATIONS

Huawei, HiSilcon; "Discussion on CA issues for shortened TTI operation"; 3GPPTSGRANWG1 Meeting #86 bis, R1-1608653; Lisbon, Portugal, Oct. 10-14, 2016 (1-4Pages) (Year: 2016).*

International Search Report issued in PCT/JP2017/039627 dated Dec. 26, 2017 (1 Page).

Written Opinion of the International Searching Authority issued in PCT/JP2017/039627 dated Dec. 26, 2017 (4 Pages).

Huawei, HiSilcon; "Discussion on CA issues for shortened TTI operation"; 3GPP TSG RAN WG1 Meeting #86bis, R1-1608653; Lisbon, Portugal, Oct. 10-14, 2016 (4 Pages).

NTT DOCOMO, Inc.; "Views on processing time reduction and related procedures"; 3GPP TSG RAN WG1 Meeting #86bis, R1-1610049; Lisbon, Portugal, Oct. 10-14, 2016 (7 Pages).

3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 Pages).

Extended European Search Report issued in counterpart European Patent Application No. 17866784.6, dated Jun. 22, 2020 (7 pages).

Office Action issued in the counterpart European Patent Application No. 17866784.6, dated Dec. 18, 2020 (6 pages).

Office Action issued in the counterpart European Patent Application No. 17866784.6, dated Jun. 4, 2021 (5 pages).

Office Action issued in Japanese Application No. 2018-549066 dated Nov. 9, 2021 (6 pages).

Office Action issued in Indonesian Application No. PID201904549; dated Dec. 6, 2021 (7 pages).

* cited by examiner

| UL/DL CONFIGU- RATION | THE NUMBER OF HARQ PROCESSES | SUBFRAME n | | | | | | | | | |
|---|---|---|---|---|---|---|---|---|---|---|---|
| | | 0 | 1 | 2 | 3 | 4 | 5 | 6 | 7 | 8 | 9 |
| 0 | 4 | — | — | 6 | — | 4 | — | — | 6 | — | 4 |
| 1 | 7 | — | — | 7,6 | 4 | — | — | — | 7,6 | 4 | — |
| 2 | 10 | — | — | 8,7,4,6 | — | — | — | — | 8,7,4,6 | — | — |
| 3 | 9 | — | — | 7,6,11 | 6,5 | 5,4 | — | — | — | — | — |
| 4 | 12 | — | — | 12,8,7,11 | 6,5,4,7 | — | — | — | — | — | — |
| 5 | 15 | — | — | 13,12,9,8,7,5,4,11,6 | — | — | — | — | — | — | — |
| 6 | 6 | — | — | 7 | 7 | 5 | — | — | 7 | 7 | — | k=4
UL/DL CONFIGU- RATION 1

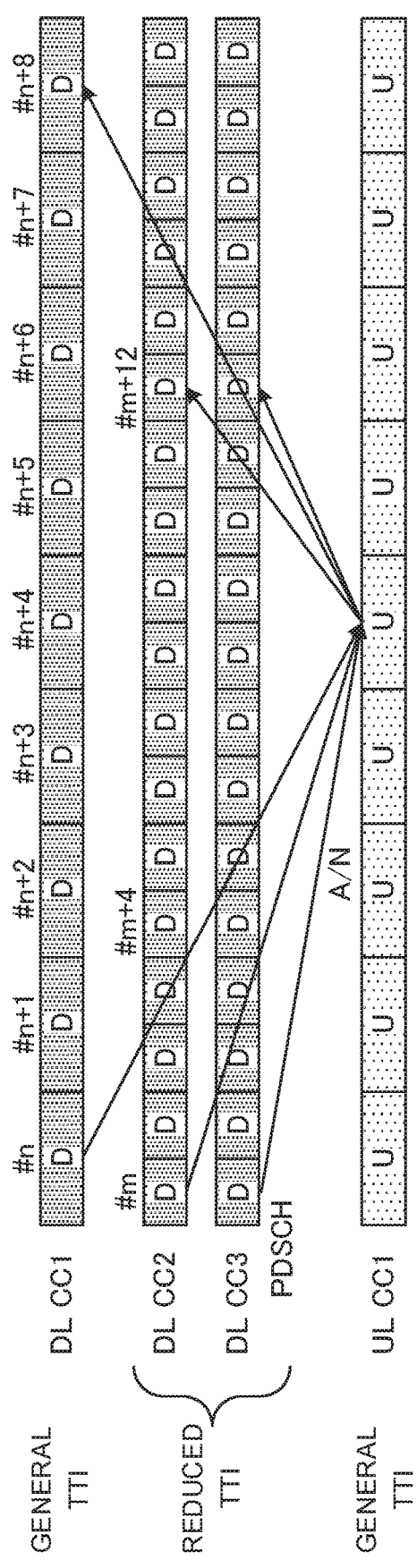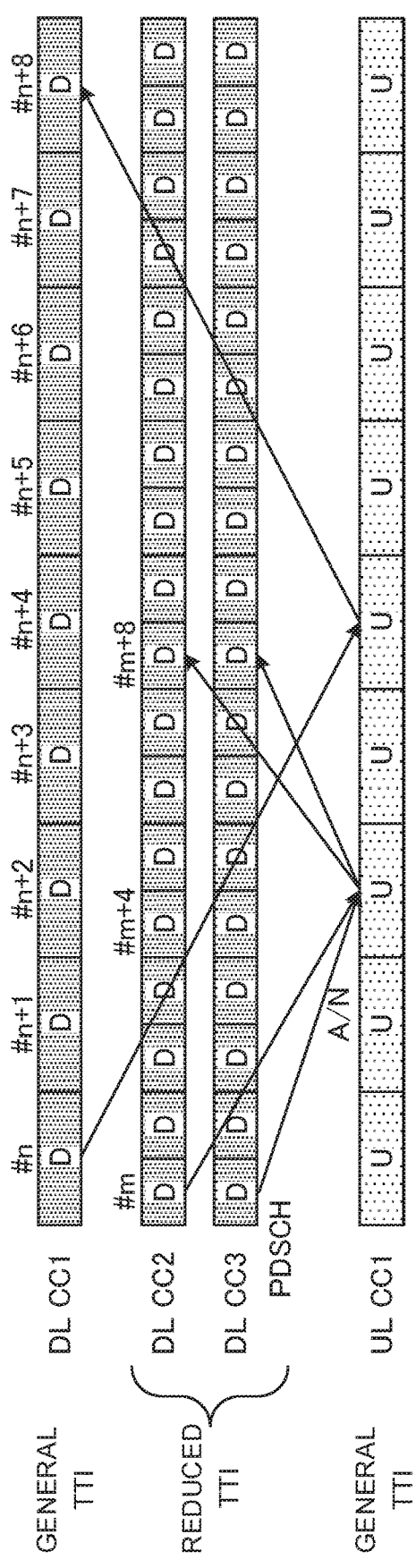

FIG. 8

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for the purpose of wider bands and a higher speed than LTE, successor systems of LTE (also referred to as, for example, LTE-Advanced (LTE-A), Future Radio Access (FRA), 4G, 5G, 5G+(plus), New RAT (NR) or LTE Rel. 13, 14 or 15~) have been also studied.

LTE Rel. 10/11 have introduced Carrier Aggregation (CA) that aggregates a plurality of Component Carriers (CC) to obtain a wider band. A system band of LTE Rel. 8 is one unit that composes each CC. Furthermore, according to CA, a plurality of CCs of the identical radio base station (eNB: eNodeB) is configured to a user terminal (UE: User Equipment).

On the other hand. LTE Rel. 12 has introduced Dual Connectivity (DC), too, that configures a plurality of Cell Groups (CG) of different radio base stations to user terminals. Each cell group includes at least one cell (CC). DC aggregates a plurality of CCs of the different radio base stations, and therefore DC is also referred to as Inter-eNB CA.

Furthermore, legacy LTE systems (e.g., LTE Rel. 8 to 13) perform communication on DownLink (DL) and/or UpLink (UL) by using Transmission Time Intervals (TTIs) (also referred to as subframes) of one ms. This TTI of one ms is a transmission time unit of one channel-coded data packet, and is a processing unit of scheduling, link adaptation and retransmission control (HARQ: Hybrid Automatic Repeat reQuest).

Furthermore, the legacy LTE systems (e.g., LTE Rel. 8 to 13) support Frequency Division Duplex (FDD) and Time Division Duplex (TDD) as Duplex schemes. FDD is a scheme of allocating different frequencies to DL and UL, and is referred to as a Frame Structure (FS) type 1. TDD is a scheme of temporarily switching the identical frequency between DL and UL, and is referred to as a frame structure type 2. According to TDD, communication is performed based on a UL/DL configuration that determines configurations of UL subframes and DL subframes in a radio frame.

Furthermore, the legacy LTE systems (e.g., LTE Rel. 8 to 13) assume that a transmission timing reference value is fixed four ms by taking into account a signal processing time of a user terminal and/or a radio base station, and control a transmission timing (DL HARQ timing) of retransmission control information (e.g., Acknowledge (ACK) or Negative ACK (NACK). A/N and HARQ-ACK that are referred to as A/N below) for a DL shared channel (e.g., PDSCH: Physical Downlink Shared Channel that is referred to as a PDSCH below).

According to, for example, FDD of the legacy LTE systems (e.g., LTE Rel. 8 to 13), when a PDSCH is received in a subframe #n, A/N of the PDSCH is transmitted (fed back) in a subframe #n+4 assuming that a processing time of the PDSCH in the user terminal is four ms. Furthermore, according to TDD, when a PDSCH is received in a DL subframe #n, A/N of the PDSCH is transmitted in a UL subframe subsequent to the subframe #n+4 assuming that a processing time of the PDSCH in the user terminal is four ms.

Similarly, the legacy LTE systems (e.g., LTE Rel. 8 to 13) control an A/N transmission timing (also referred to as a UL HARQ timing) for a UL shared channel (e.g., a PUSCH: Physical Uplink Shared Channel that is referred to as a PUSCH below), too, assuming that a reference value of a signal transmission timing in the user terminal and/or the radio base station is fixed four ms.

CITATION LIST

Patent Literature

Non-Patent Literature 1: 3GPP TS 36.300 Rel.8 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future radio communication systems (e.g., LTE Rel. 14 and 15~, 5G and NR) are demanded to realize latency reduction to provide communication service such as URLLC of a strict request requirement for latency. In this regard, latency includes latency (propagation latency) of a signal propagation time, and latency (processing latency) of a signal processing time.

Such a latency reduction method is assumed as a method for newly introducing TTIs (also referred to as short TTIs, partial subframes or mini subframes) shorter than subframes (TTI) of one ms, and reducing a communication control (e.g., scheduling or/and retransmission control) processing unit itself.

At the same time, when the subframe of one ms is maintained as the communication control processing unit, too, it is desired to reduce latency. When the subframe of one ms is maintained as the communication control processing unit, it is assumed to configure a short transmission timing reference value (that is reduced compared to, for example, four ms), and control a signal processing time (that may be a processing time or a parameter related to the processing time) in a radio base station and/or a user terminal to reduce latency.

Furthermore, similar to the legacy LTE systems, future radio communication systems that introduce reduced TTIs or reduced processing times are also assumed to perform communication (e.g., CA and/or DC) by using a plurality of cells (CCs). When communication is performed by using a plurality of cells (CCs) for DL transmission and/or UL transmission in this way, a problem is how to apply a reduced TTI and/or a reduced processing time and control communication.

The present invention has been made in light of this point, and one of objects of the present invention is to provide a user terminal and a radio communication method that can control communication by appropriately using a reduced TTI and/or a reduced processing time when performing communication by using a plurality of cells (CCs) during DL and/or UL transmission.

Solution to Problem

One aspect of a user terminal according to the present invention is a user terminal that performs communication by using a plurality of cells for DL transmission and/or UL transmission, and includes: a reception section that receives a DL signal; and a control section that controls transmission of a UL signal at a predetermined timing based on the DL signal, and the control section controls the predetermined timing based on at least a number of cells used for the UL transmission.

Advantageous Effects of Invention

According to the present invention, it is possible to control communication by appropriately using a reduced TTI and/or a reduced processing time when performing communication by using a plurality of cells (CCs) during DL and/or UL transmission.

BRIEF DESCRIPTION OF DRAWINGS

FIGS. 7A and 7B are diagrams illustrating another example of an A/N transmission timing according to the second embodiment.

FIG. 8 is a diagram illustrating one example of a configuration example of a reduced TTI according to the second embodiment.

DESCRIPTION OF EMBODIMENTS

Legacy LTE systems (LTE Rel. 8 to 13) support a Hybrid Automatic Repeat reQuest (HARQ) to prevent deterioration of communication quality between a user terminal (UE: User Equipment) and a radio base station (eNB: eNodeB).

For example, the user terminal transmits A/N of a PDSCH by using a PUSCH or a PUCCH based on a reception result of the PDSCH on DL of the legacy LTE systems. The radio base station controls transmission (including initial transmission and/or retransmission) of the PDSCH based on the A/N from the user terminal.

Furthermore, the user terminal transmits the PUSCH scheduled by a UL grant from the radio base station on UL of the legacy LTE systems. The radio base station transmits A/N of the PUSCH by using a retransmission control channel (e.g., PHICH: Physical Hybrid-ARQ Indicator Channel) based on the reception result of the PUSCH. The user terminal controls transmission (including initial transmission and/or retransmission) of the PUSCH based on the A/N from the radio base station.

On DL and/or UL (DL/UL below) of the legacy LTE systems, an A/N transmission timing (also referred to as a DL/UL HARQ timing) is controlled based on a transmission timing reference value defined in advance after a predetermined time from a subframe in which data has been transmitted and received.

Furthermore, on DL of the legacy LTE systems, the A/N transmission timing of a PDSCH is controlled after the predetermined time from the subframe in which the PDSCH has been received. For example, according to FDD, A/N of the PDSCH is transmitted in a subframe that comes four ms after from the PDSCH receiving subframe.

Figure 1:
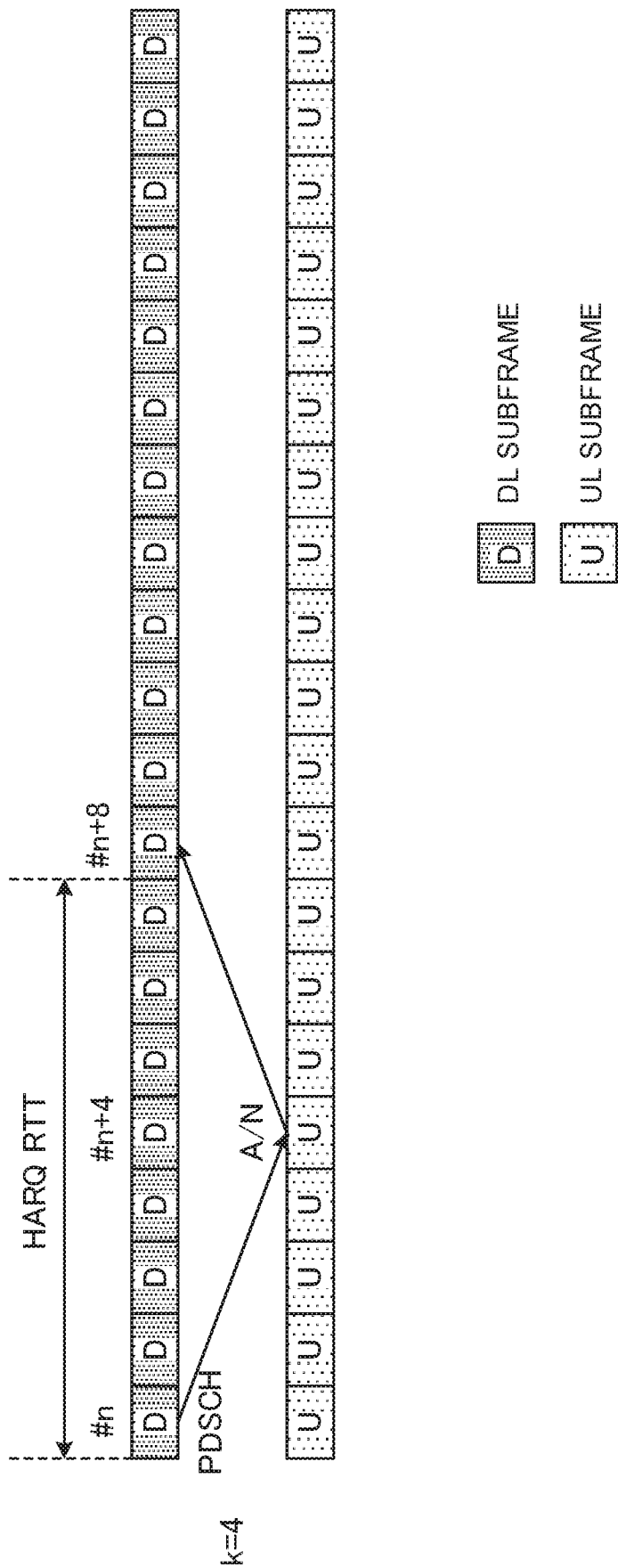
FIG. 1 is a diagram illustrating one example of an A/N transmission timing of FDD.

FIG. 1 is a diagram illustrating one example of an A/N transmission timing according to FDD. As illustrated in FIG. 1, according to FDD, when receiving a PDSCH in a subframe #n, the user terminal transmits A/N of the PDSCH in a subframe #n+4 that comes four ms after to the radio base station. The radio base station performs retransmission or initial transmission of a HARQ process in a subframe subsequent to a subframe #n+8 (that may be prior to the subframe #n+8) that comes four ms after the A/N received in the subframe #n+4.

Furthermore, according to HARQ, retransmission control of data (a Transport Block (TB) or a Code Block (CB)) is performed in a processing unit of a process (HARQ process). According to the HARQ process of the identical number (HARQ Process Number (HPN)), the identical data is retransmitted until ACK is received. Furthermore, one HARQ process is used for one subrame. By processing a plurality of HARQ processes independently in parallel, it is possible to transmit data of a next HARQ process without waiting for A/N of a previous HARQ process, and reduce a latency time.

For example, in FIG. 1, the HARQ Process Number (HPN) used for transmission of the PDSCH in the subframe #n can be reused in the subframe #n+8 that comes eight ms after. Thus, a time taken until the identical HPN can be reused (i.e., a time taken until it is possible to perform retransmission or initial transmission based on a reception result of data after transmission of the data) is also referred to as a Round Trip Time (RTT) (HARQ RTT).

As illustrated in FIG. 1, according to FDD of the legacy LTE systems, the HARQ RTT is eight subframes (eight ms). Furthermore, the HARQ RTT includes the eight subframes, and therefore the maximum number of HARQ processes (also referred to as the number of HARQ processes) is eight.

On the other hand, according to TDD of the legacy LTE systems, assuming that a PDSCH processing time of the user terminal is equal to that of FDD. A/N of the PDSCH is transmitted in a UL subframe that comes four ms after the PDSCH receiving subframe. According to TDD, an A/N transmission timing is determined based on the UL/DL configuration of TDD.

Figure 2:
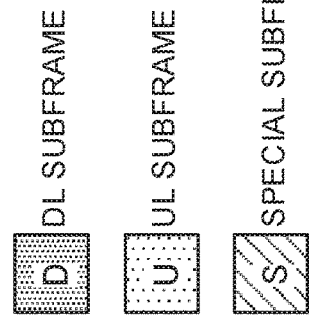
FIG. 2 is a diagram illustrating one example of UL/DL configurations.

FIG. 2 is a diagram illustrating one example of UL/DL configurations. As illustrated in FIG. 2, according to TDD of the legacy LTE systems, seven frame configurations of UL/DL configurations 0 to 6 of different ratios between a UL subframe and a DL subframe are defined. Subframes #0 and #5 are allocated to downlink, and a subframe #2 is allocated to uplink. Furthermore, a periodicity of a change point from the DL subframe to the UL subframe is five ms according to the UL/DL configurations 0, 1, 2 and 6, and a periodicity of a change point from a DL subframe to a UL subframe is 10 ms according to the UL/DL configurations 3, 4 and 5.

According to the UL/DL configurations 2, 3, 4 and 5 in FIG. 2, rates of DL subframes with respect to UL subframes are configured relatively high (DL is considered as important). In addition, a special subframe is a subframe for switching between DL and UL, and can be used mainly for DL communication. The DL subframe and/or the special subframe will be referred to as a DL/special subframe below.

Figures 3A, 3B:
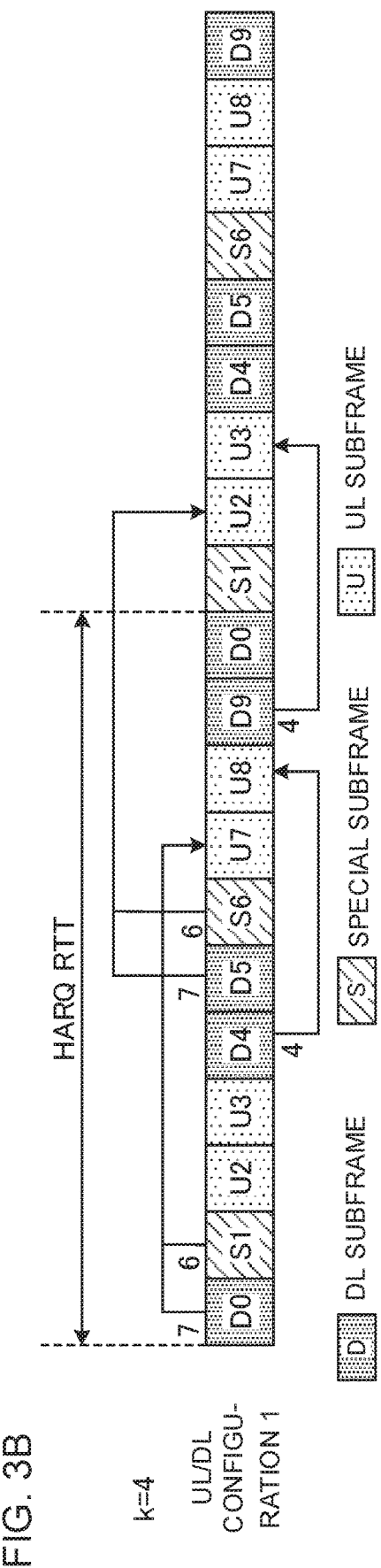
FIGS. 3A and 3B are diagrams illustrating one example of an A/N transmission timing of TDD.

FIG. 3 is a diagram illustrating one example of an A/N transmission timing according to TDD. FIG. 3A illustrates a relationship between the DL/special subframe in which a PDSCH is received, and a UL subframe in which A/N for the PDSCH is transmitted in each UL/DL configuration.

More specifically, FIG. 3A illustrates which A/N of PDSCHs received in which DL/special subframe in the UL subframe #n (0≤n≤9) of each UL/DL configuration is transmitted. FIG. 3A illustrates a value of k in a case where A/N of PDSCH received in a DL/special subframe #n-k that comes k subframes before is transmitted in the UL subframe #n (0≤n≤9) of each UL/DL configuration.

According to, for example, a value of k defined in the UL/DL configuration 1 in FIG. 3A, as illustrated in FIG. 3B, A/N for the PDSCHs received in a DL subframe #0 and a special subframe #1 that come seven and six subframes before is transmitted in the UL subframe #7. Furthermore, A/N for the PDSCH received in a DL subframe #4 that comes four subframes before is transmitted in the UL subframe #8. A/N for the PDSCHs received in a DL subframe #5 and a special subframe #6 that come seven and six subframes before is transmitted in the UL subframe #2. A/N for the PDSCH received in a DL subframe #9 that comes four subframes before is transmitted in the UL subframe #3.

Thus, according to TDD, a UL subframe that comes four ms after a DL/special subframe #n in which the PDSCH is received is not necessarily a UL subframe. Hence, the value of k is configured in the above table such that a PDSCH is transmitted in a UL subframe that comes four subframes after a PDSCH receiving subframe. Furthermore, A/N of the PDSCHs received in one or more DL/special subframes can be transmitted in a single bundled UL subframe.

Furthermore, according to TDD, the HARQ RTT and the maximum number of HARQ processes are configured not to a fixed value (eight) of FDD, but to a value matching each UL/DL configuration. As illustrated in, for example, FIG. 3B, according to the UL/DL configuration 1, A/N of the PDSCH of the DL subframe #0 is transmitted in the UL subframe #7, and the PDSCH is retransmitted in the special subframe #1 that comes four ms after the UL subframe #7 based on the A/N.

In a case of FIG. 3B, the identical HPN can be reused in the special subframe #1 that comes 11 subframes after the DL subframe #0, so that the HARQ RTT is 11 subframes. Thus, according to TDD, the HARQ RTT is equal to a maximum value of k (seven in a case of the UL/DL configuration 1) of each UL/DL configuration+four subframes. Furthermore, the maximum number of HARQ processes is equal to the number of DL/special subframe in the HARQ RTT, and, as illustrated in FIGS. 3A and 3B, the maximum number of HARQ processes is seven in the UL/DL configuration 1. Similarly, the HARQ RTTs and the numbers of HARQ processes according to the other UL/DL configurations are also configured.

As described above, the legacy LTE systems (prior to Rel. 13) controls an A/N transmission timing as a fixed value based on four ms (as a reference value).

By the way, future radio communication systems (e.g., LTE Rel. 14 and 15~, 5G and NR) are demanded to realize latency reduction to provide communication service such as URLLC of a strict request requirement for latency. In this regard, latency includes latency (propagation latency) of a signal propagation time, and latency (processing latency) of a signal processing time.

Such a latency reduction method is assumed as a method for newly introducing TTIs (short TTIs) shorter than subframes (TTI) of one ms, and reducing a communication control (e.g., scheduling or/and retransmission control) processing unit itself.

The TTI (referred to as a "general TTI" below) according to LTE Rel. 8 to 12 has a time duration of one ms. The general TTI is also referred to as a subframe, and includes two time slots. The TTI is a transmission time unit of one channel-coded data packet (transport block), and is a processing unit of scheduling or link adaptation.

According to the legacy LTE systems, in a case of a general Cyclic Prefix (CP) on DownLink (DL), the general TTI is configured to include 14 Orthogonal Frequency Division Multiplexing (OFDM) symbols (seven OFDM symbols per slot). Each OFDM symbol has a time duration (symbol length) of 66.7 μs, and is added with a general CP of 4.76 μs. The symbol length and a sub-carrier spacing have a relationship of reciprocals, and therefore when the symbol length is 66.7 μs, the sub-carrier spacing is 15 kHz.

Furthermore, in a case of a general Cyclic Prefix (CP) on UpLink (UL), the general TTI is configured to include 14 Single Carrier Frequency Division Multiple Access (SC-FDMA) symbols (seven SC-FDMA symbols per slot). Each SC-FDMA symbol has a time duration (symbol length) of 66.7 μs, and is added with a general CP of 4.76 μs. The symbol length and the sub-carrier spacing have a relationship of reciprocals, and therefore when the symbol length is 66.7 μs, the sub-carrier spacing is 15 kHz.

In addition, in a case of an extended CP, the general TTI may be configured to include 12 OFDM symbols (or 12 SC-FDMA symbols). In this case, each OFDM symbol (or each SC-FDMA symbol) has a time duration of 66.7 μs, and is added with the extended CP of 16.67 μs.

On the other hand, it is desired for the future radio communication systems to provide a radio interface that is suitable to a high frequency band such as several tens of GHz, and a radio interface that minimizes latency for Internet of Things (IoT), Machine Type Communication (MTC), Machine To Machine (M2M), Device To Device (D2D) and Vehicular To Vehicular (V2V) service.

Hence, it is considered for the future communication systems to perform communication by using a reduced TTI (also referred to as a short TTI) obtained by reducing a TTI compared to one ms. For example, it is considered to perform communication by applying a general TTI (one ms) to part of cells, and applying a reduced TTI to the other cells. Alternatively, it is considered to perform communication by applying reduced TTIs (reduced TTIs of the same or different TTI lengths) to all cells. It is considered to change a sub-carrier spacing from a subcarrier of a general TTI (e.g., expand the sub-carrier spacing) when the reduced TTIs are used.

When a TTI (referred to as a "reduced TTI" below) of a shorter time duration than that of the general TTI is used, a temporal margin for processing (e.g., encoding and decoding) of the user terminal and the radio base station increases, so that it is possible to reduce processing latency. Furthermore, when the reduced TTI is used, it is possible to increase the number of user terminals that can be accommodated per unit time (e.g., one ms).

On the other hand, when a subframe of one ms is maintained as a communication control processing unit, too, it is desired to reduce latency. This is because, when the communication control processing unit is maintained, it is possible to reuse a legacy channel configuration (e.g., a PDSCH, a DL control channel (PDCCH: Physical Downlink Control Channel or an EPDCCH: Enhanced Physical Downlink Control Channel), a PUSCH or a PUCCH).

It is considered to reduce a signal processing time (apply a reduced processing time) in the radio base station and/or the user terminal to reduce latency when the subframe of one ms is maintained as the communication control processing unit.

Furthermore, future radio communication systems that introduce the reduced TTI or the reduced processing time are also assumed to perform communication (e.g., CA and/or DC) that uses a plurality of cells (CCs) similar to the legacy LTE systems. In this case, there are also considered a mode (DL-CA and UL-non-CA) that configures a plurality of cells to one of DL transmission and UL transmission (e.g., only DL transmission) and performs communication, and a mode that configures a different number of cells used for DL transmission and a different number of cells used for UL transmission. When a plurality of cells (CCs) are used for DL transmission and/or UL transmission to perform communication, a problem is to how to apply the reduced TTI and/or the reduced processing time to perform communication.

Then, the inventors of the present invention have conceived an idea of controlling signal transmission and/or reception timings based on at least the number of cells used for (configured to) UL transmission and whether or not a plurality of cells are used for (e.g. whether or not CA is applied) to UL transmission. More specifically, cells to which a reduced TTI and/or a reduced processing time are applied are controlled based on at least whether or not CA is applied to UL transmission.

The present embodiment will be described in detail below. Transmission of a transmission acknowledgement signal (HARQ-ACK) for a DL signal (e.g., DL data channel) and transmission of uplink data for a DL signal (e.g., a UL transmission instruction and a UL grant) will be described as an example in the following description. However, an applicable signal/channel are not limited to these. The present embodiment is applicable to signals (or channels) whose transmission and/or reception are controlled at predetermined timings.

Furthermore, the present embodiment is applicable to FDD and/or TDD. Although FDD will be described as an example in the following description, the present embodiment is applicable to TDD, too, likewise. According to TDD, a cell to which a reduced processing time and/or a reduced TTI are configured only needs to control communication by using a table that supports the reference value (k) configured when the reduced processing time is applied.

First Embodiment

According to the first embodiment, cells to which a reduced processing time is applied are controlled based on at least the number of cells used for UL transmission or whether or not a plurality of cells are used for (whether or not CA and/or DL are applied to) UL transmission. A user terminal that applies the reduced processing time controls a reference value (k) computed based on a signal processing time of the user terminal and/or a radio base station as a value shorter than existing four ms, and controls an A/N transmission timing and/or a UL scheduling timing based on the reference value. In addition, k may be referred to as the reduced processing time.

<First Case>

The first case assumes that carrier aggregation (DL-CA) is performed on a plurality of DL carriers yet CA is not performed on UL carriers (UL-non-CA). For example, the first case corresponds to a case where a plurality of cells (also referred to as CCs or carriers) are configured to DL transmission, and a single cell is configured to UL transmission.

In this case, the user terminal may apply the reduced processing time to all DL carriers and UL carriers configured to the user terminal. That is, the user terminal may not assume that the reduced processing time is configured only to UL carriers. Furthermore, the user terminal may not assume that the reduced processing time is configured only to part of a plurality of DL carriers.

Furthermore, when the configuration of the reduced processing time is indicated to the user terminal by higher layer signaling (or physical layer signaling), and the user terminal receives/identifies the signaling, the reduced processing time may be applied to all DL carriers and UL carriers as described above. Consequently, it is possible to identically control, for example, a HARQ-ACK transmission timing in a case where DL data is scheduled by a DL assignment in a certain subframe, and a UL data transmission timing in a case where UL data is scheduled by a UL grant in the same subframe. Furthermore, irrespectively of in which DL-CCs the DL data is scheduled, it is possible to identically control the HARQ-ACK transmission timing and the UL data transmission timing. Consequently, the user terminal does not need to implement HARQ-ACK feedback control for both of the case where there is the only DL assignment and the case where there are both of the DL assignment and the UL grant, so that it is possible to reduce a circuit scale.

When the reduced processing time (that is, for example, the reference value k less than four) is configured to all DL carriers and UL carriers, the user terminal controls the A/N transmission timing and/or the UL signal scheduling (transmission) timing based on the reduced processing time k. The A/N transmission timing may include transmission timings of A/N for a DL signal and A/N for a UL signal.

Figure 4A:
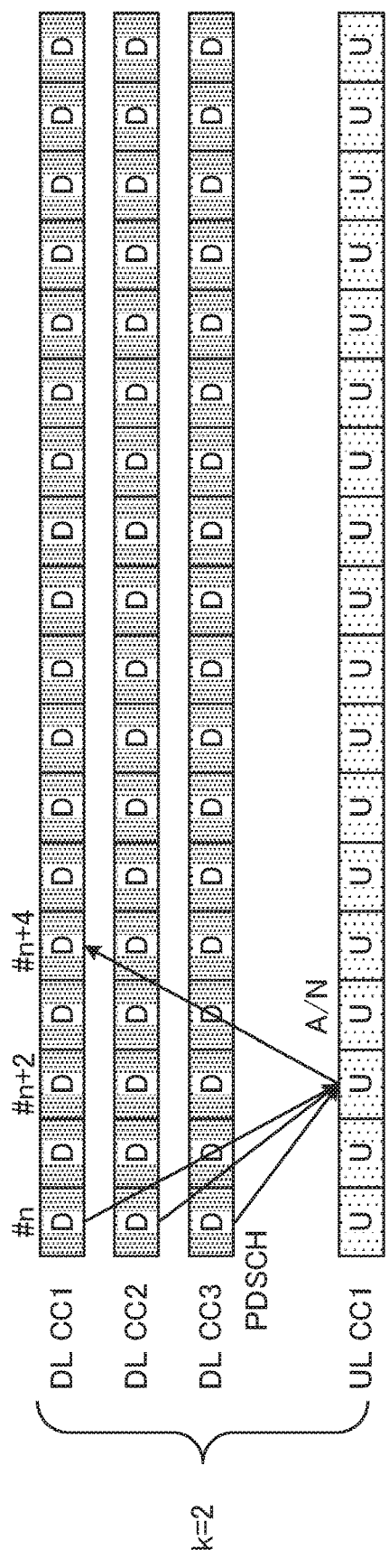
FIGS. 4A and 4B are diagrams illustrating one example of an A/N transmission timing according to a first embodiment.
Figure 4B:
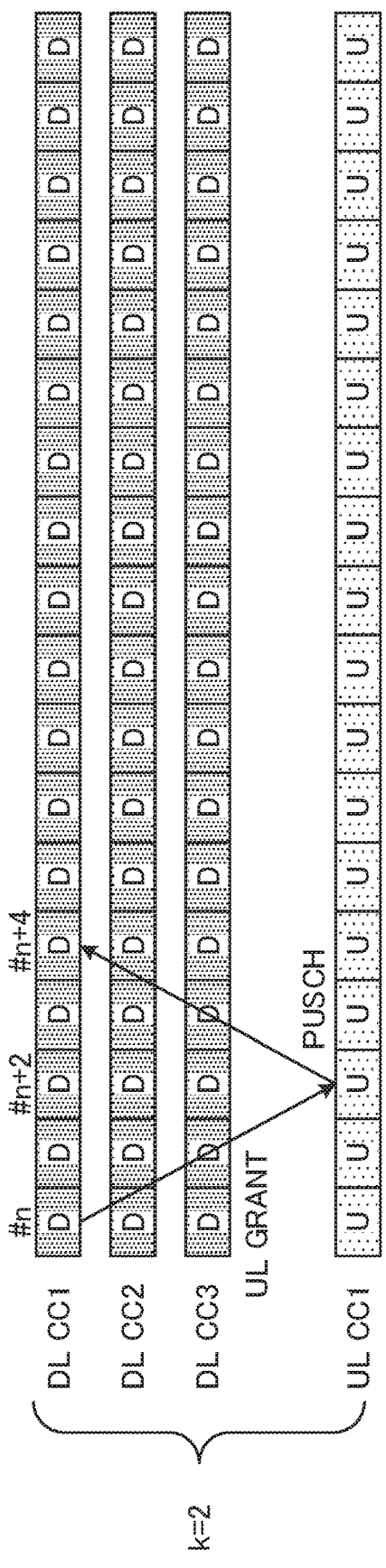

FIG. 4 is a diagram illustrating a control example of the first case according to the first embodiment. For example, FIG. 4 illustrates the control example of a transmission timing of A/N for a DL signal (e.g., PDSCH). FIG. 4B illustrates a control example of a scheduling timing of a UL signal (e.g., PUSCH).

FIGS. 4A and 4B illustrate that a plurality of DL carriers (DL CCs) 1 to 3 are configured to DL transmission, and a single UL carrier (UL CC) 1 is configured to UL transmission. In this case. CA is performed by using the DL carriers (DL CCs) 1 to 3, and CA is not performed on the UL carrier. In this regard, the number of DL carriers subjected to CA is not limited to this. Furthermore, although, in FIGS. 4A and 4B, the reduced processing time k=2 is configured, the value of k only needs to be, for example, a value such as one or three smaller than four ms.

As illustrated in FIGS. 4A and 4B, when CA is not performed on the UL carrier, the identical reduced processing time k may be configured to all DL carriers and UL carriers. For example, in FIG. 4A, when receiving PDSCHs of the DL carriers 1 to 3 in subframes #n, the user terminal transmits A/N of the DL carriers 1 to 3 in subframes #n+3 that come two ms after based on k=2. In addition, although not illustrated, a transmission timing of A/N for a PUSCH in the radio base station may be controlled likewise.

Furthermore, in FIG. 4B, the user terminal receives a UL grant for scheduling a PUSCH of the UL carrier 1 in the subframe #n of the DL carrier 1, and transmits the PUSCH in the subframe #n+2 that comes two ms after in the UL carrier 1 based on k=2.

Consequently, by applying the reduced timing to all DL carriers and UL carriers configured to the user terminal in the case 1, it is possible to identically control, for example, a HARQ-ACK transmission timing in a case where DL data is scheduled by a DL assignment in a certain subframe, and a UL data transmission timing in a case where UL data is scheduled by a UL grant in the same subframe. Furthermore, irrespectively of in which one of DL-CCs DL data is scheduled, it is possible to identically control the HARQ-ACK transmission timing and the UL data transmission timing. Consequently, the user terminal does not need to implement HARQ-ACK feedback control for both of the case where there is the only DL assignment and the case where there are both of the DL assignment and the UL grant, so that it is possible to suppress an increase in a circuit scale.

<Second Case>

The second case assumes that CA (DL-CA) is performed on a plurality of DL carriers, and CA (UL-CA) is also performed on UL carriers. For example, the second case corresponds to a case where a plurality of cells (referred to as CCs or carriers) are configured to DL transmission and a plurality of cells are configured to UL transmission, too. In this regard, the number of cells configured to DL transmission may be different from the number of cells configured to UL transmission (e.g., the number of cells for DL transmission is configured larger than the number of cells of UL transmission).

In this case, the user terminal may apply the reduced processing time to at least one UL carrier, or at least one DL carrier and at least one UL carrier. Consequently, it is possible to apply the reduced processing time only to part of UL-CCs of a plurality of UL-CCs. When the reduced processing time is configured, a data transmission/reception processing time of the user terminal becomes short, and therefore a maximum value of Timing Advance (TA) control that the user terminal can apply to uplink is assumed to become short compared to the case of a general processing time. Even in this case, by limiting application of the reduced processing time to part of UL-CCs or part of UL and DL-CCs, it is possible to make the maximum value of timing advance control the same value as the general processing time for at least part of UL-CCs to which the reduced processing time is not applied. As a result, it is possible to avoid reduction of a communicable distance. For example, the user terminal may assume that the reduced processing time is configured only to part of UL carriers or only to part of DL carriers and/or UL carriers.

In the second case, when the reduced processing time is configured only to part of DL carriers and/or UL carriers, the DL carriers and the UL carriers to which the reduced processing time is applied may have the identical index (e.g., a cell index or a CC index). In this case, the user terminal can control communication assuming that the reduced processing time is applied to the DL carriers and the UL carriers having the identical cell index. Furthermore, in this case, higher layer signaling (or physical layer signaling) of configuring the reduced processing time to the user terminal can be signaling of indicating a cell index or a CC index and configuring the reduced processing time. The user terminal configures the reduced processing time based on the cell index or the CC index to which this signaling has been configured.

Furthermore, when the reduced processing time is configured to a plurality of UL carriers, a plurality of UL carriers may belong to the identical Cell Group (CG) and/or the same Timing Advance Group (TAG). Furthermore, in this case, the higher layer signaling (or the physical layer signaling) of configuring the reduced processing time to the user terminal can be signaling of indicating a CG index (an MCG or an SCG) or a TAG index and configuring the reduced processing time. The user terminal configures the reduced processing time based on the CG index or the TAG index to which the signaling has been configured.

The user terminal controls an A/N transmission timing of each DL carrier and each UL carrier and/or a scheduling timing of a UL signal based on the processing time k configured per DL carrier and per UL carrier. In addition, the A/N transmission timing may include transmission timings of A/N for a DL signal and A/N for a UL signal.

Figure 5A:
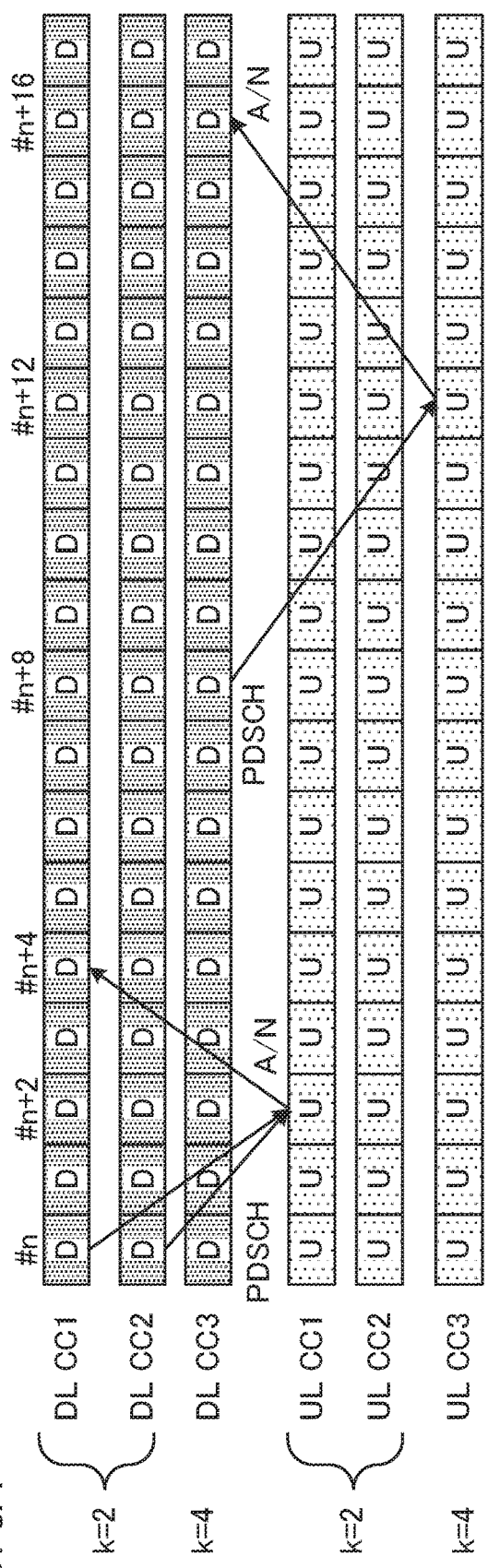
FIGS. 5A and 5B are diagrams illustrating one example of a UL data transmission timing according to the first embodiment.
Figure 5B:
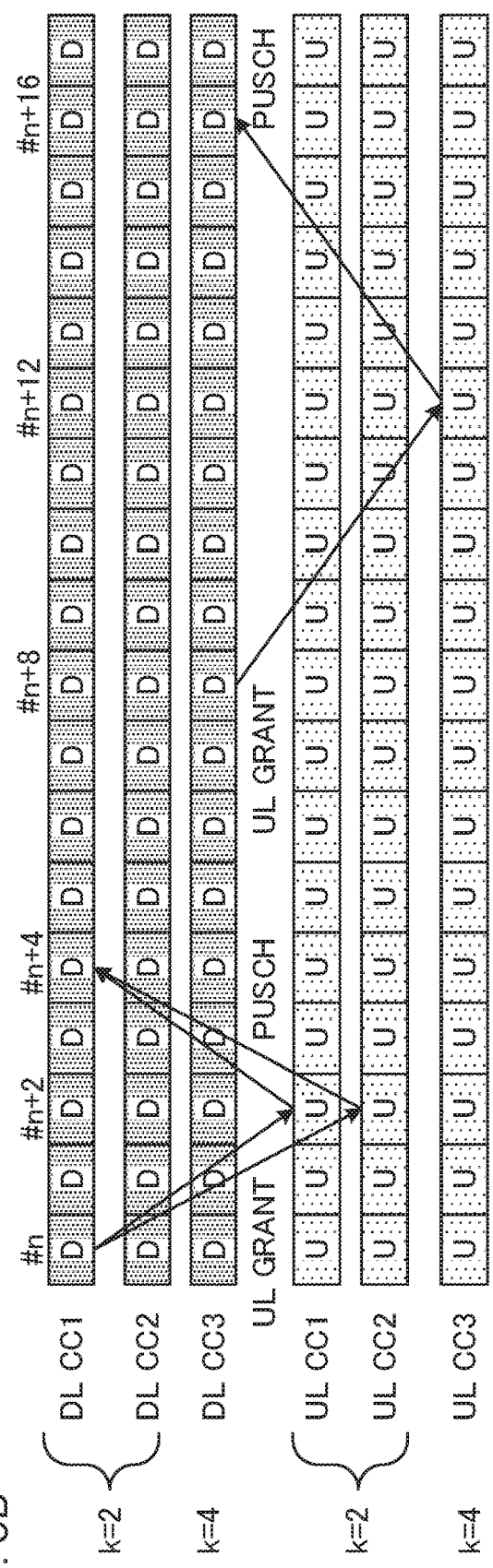

FIG. 5 is a diagram illustrating a control example of the second case according to the first embodiment. For example, FIG. 5A illustrates a control example of a transmission timing of A/N for a DL signal (e.g., PDSCH). FIG. 5B illustrates a control example of a scheduling timing of a UL signal (e.g., PUSCH).

In addition, although FIGS. 5A and 5B assume that CA is performed on the DL carriers (DL CCs) 1 to 3 and CA is performed on UL carriers (UL CCs) 1 to 3, the number of DL carriers and the number of UL carriers subjected to CA are not limited to these.

As illustrated in FIGS. 5A and 5B, when CA is performed on the UL carriers, the reduced processing time k may be configured to at least one DL carrier (the DL carriers 1 and 2 in this case) and at least one UL carrier (the UL carriers 1 and 2 in this case). In this regard, although k=2 is configured in FIGS. 5A and 5B, the value of k may be a value such as one or three smaller than four ms.

For example, in FIG. 5A, when receiving PDSCHs of the DL carriers 1 and 2 in the subframes #n, the user terminal transmits A/N of the DL carriers 1 and 2 in the subframes #n+2 that come two ms after based on k=2. Furthermore, when receiving the PDSCH of the DL carrier 3 in a subframe #n+8, the user terminal may transmit A/N of the DL carrier 3 in a subframe #n+12 that comes four ms after based on k=4. In addition, although not illustrated, a transmission timing of A/N for a PUSCH in the radio base station may be controlled likewise.

Furthermore, in FIG. 5B, the user terminal receives a UL grant for scheduling PUSCHs of the UL carriers 1 and 2 in the subframes #n of the DL carriers 1 and 2, and transmits the PUSCHs in the subframes #n+2 that come two ms after in the UL carriers 1 and 2 based on k=2. Furthermore, the user terminal receives the UL grant for scheduling a PUSCH of the UL carrier 3 in the subframe #n+8 of the DL carrier 3, and transmits the PUSCH in the subframe #n+12 that comes four ms after in the UL carrier 3 based on k=4.

Thus, cell (CC) indices of DL carriers and UL carriers (e.g., the DL carriers 1 and 2 and the UL carriers 1 and 2, and the DL carrier 3 and the UL carrier 3 in FIGS. 5A and 5B) to which the identical reduced processing time k is configured may be associated. Furthermore, a plurality of UL carriers (e.g., the UL carriers 1 and 2 in FIGS. 5A and 5B) to which the identical reduced processing time k is configured may belong to the identical CG and/or TAG. In addition, although only reduced processing time k=2 is used in FIGS. 5A and 5B, a reduced processing time that differs per carrier may be configured.

Consequently, by applying the reduced processing time to at least one UL carrier configured to the user terminal in the case 2 or at least one DL carrier and UL carrier, it is possible to apply the reduced processing time only to part of UL-CCs of a plurality of UL-CCs. When the reduced processing time is configured, a data transmission/reception processing time of the user terminal becomes short, so that a maximum value of Timing Advance (TA) control that the user terminal can apply to uplink is assumed to become short compared to the case of the general processing time. Even in this case, by limiting application of the reduced processing time to part of UL-CCs or part of UL and DL-CCs, it is possible to make the maximum value of the timing advance control the same value as the general processing time for at least part of UL-CCs to which the reduced processing time is not applied. As a result, it is possible to avoid reduction of a communicable distance.

Second Embodiment

According to the second embodiment, cells to which a reduced TTI is applied is controlled based on at least the number of cells used for UL transmission or whether or not a plurality of cells are used for (whether or not CA and/or DC are applied to) UL transmission. A user terminal to which the reduced TTI is applied controls an A/N transmission timing and/or a UL scheduling timing based on the reduced TTI having a shorter TTI length than a TTI (also referred to as a general TTI) of one ms.

<First Case>

The first case assumes that carrier aggregation (DL-CA) is performed on a plurality of DL carriers is performed yet CA is not performed on UL carriers (UL-non-CA). For example, the first case corresponds to a case where a plurality of cells (also referred to as CCs or carriers) are configured to DL transmission, and a single cell is configured to UL transmission.

In this case, the user terminal may apply the reduced TTI to at least one DL carrier. For example, the user terminal may assume that a reduced processing time is configured only to part of DL carriers. Consequently, it is possible to obtain a latency reduction effect without limiting a coverage of uplink or a maximum value of Timing Advance (TA) that is significantly influenced by the TTI length.

When the reduced TTI is configured to part of DL carriers, the user terminal controls reception (e.g., reception timing) of DL data based on the reduced TTI for the DL carriers. Furthermore, when the reduced TTI is configured to UL carriers, the user terminal controls a transmission timing A/N for DL data transmitted at the reduced TTI, and/or a scheduling (transmission) timing of the UL signal. For example, the user terminal can feed back the UL signal (HARQ-ACK or UL data) for the DL signal after 4×reduced TTI.

FIG. 6 illustrates one example of a control example of the first case according to the second embodiment. FIG. 6 illustrates that a plurality of cells (CCs 1 to 3) are configured to DL transmission, and a single cell (CC 1) is configured to UL transmission. Furthermore, FIG. 6 illustrates that the reduced TTI is applied to a UL CC 1 and DL CCs 2 and 3, and a general TTI is applied to a DL CC 1, too.

Figure 6A:
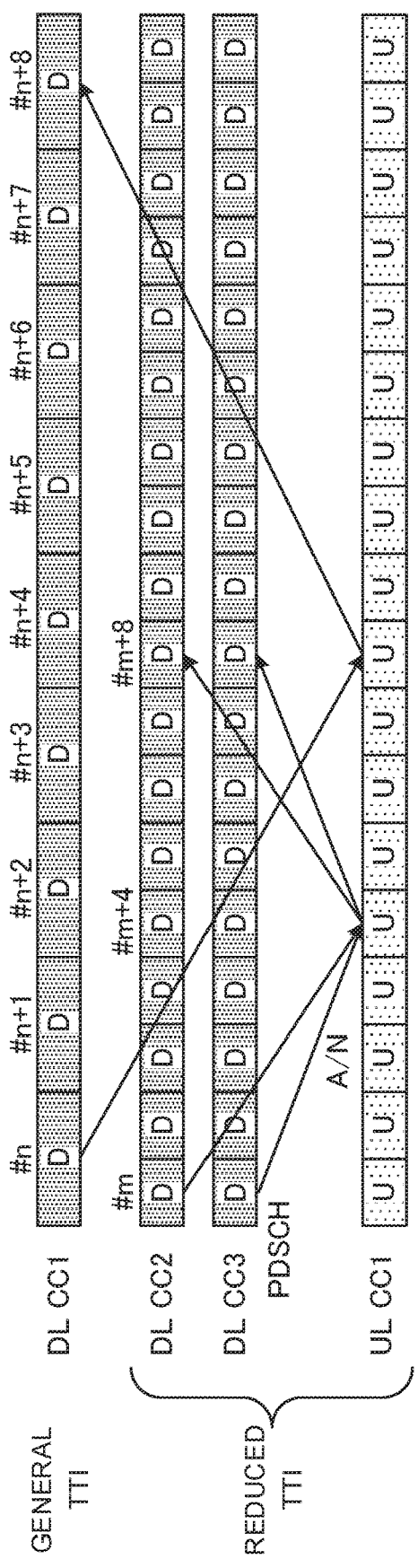
FIGS. 6A and 6B are diagrams illustrating one example of an A/N transmission timing according to a second embodiment.

In this case, the user terminal can feed back a UL signal (HARQ-ACK or UL data) for the DL signal transmitted at the reduced TTI, at a reduced TTI #m+4 after 4×reduced TTI (see FIG. 6A). FIG. 6A illustrates that A/N for DL signals transmitted at the reduced TTI (#m in this case) of the DL CCs 2 and 3 is fed back at the reduced TTI #m+4. Furthermore, the user terminal can receive the DL signals based on the A/N after 4×reduced TTI. In addition, the present embodiment has described the case where a feedback timing is 4×reduced TTI. However, the feedback timing is not limited to this (the same applies to the following description).

The user terminal feeds back the UL signal for the DL signal transmitted at the general TTI after 4×general TTI. Furthermore, the user terminal can receive the DL signal based on the A/N after 4×general TTI.

Figure 6B:
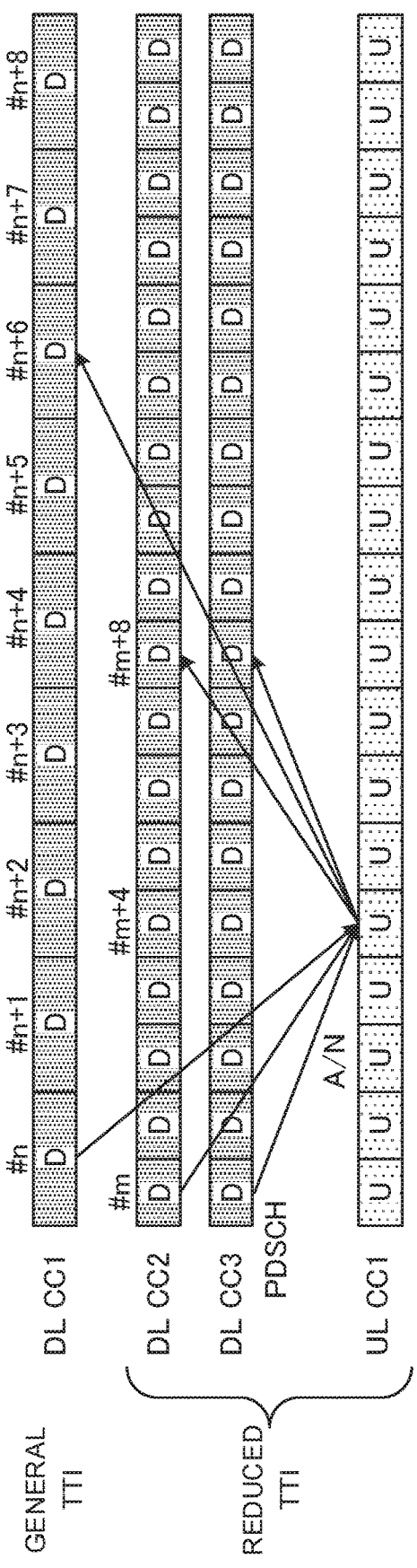

Alternatively, the user terminal may be configured to feed back the UL signal for the DL signal transmitted at the general TTI after 4×reduced TTI, and receive the DL signal based on the A/N at the general TTI (#n+6 in this case) corresponding to a time after 4×general TTI (see FIG. 6B). In this case, by scheduling data to DL-CCs to which the reduced TTI has been configured, it is possible to further enhance the latency reduction effect.

When the reduced TTI is not configured to UL carriers, the general TTI is applied to control transmission of UL data. FIG. 7 illustrates another example of the control example of the first case according to the second embodiment. FIG. 7 illustrates that a plurality of cells (CCs 1 to 3) are configured to DL transmission, and a single cell (CC 1) is configured to UL transmission. Furthermore, FIG. 7 illustrates that the reduced TTI is applied to the DL CCs 2 and 3 and the general TTI is applied to the UL CC 1 and the DL CC 1.

In this case, the user terminal can feed back a UL signal (HARQ-ACK or UL data) for a DL signal transmitted at the reduced TTI at a general TTI (that is the same as those of the legacy systems) after 4×general TTI (see FIG. 7A). FIG. 7A illustrates that A/N for the DL signals transmitted at the reduced TTI (#m in this case) of the DL CCs 2 and 3 is fed back at a general TTI #n+4. Furthermore, the user terminal can receive the DL signal based on the A/N after 4×reduced TTI.

Alternatively, the user terminal may feed back the UL signal (HARQ-ACK or UL data) for the DL signal transmitted at the reduced TTI, at the general TTI corresponding to a time after 4×reduced TTI (see FIG. 7B). FIG. 7B illustrates that A/N for the DL signals transmitted at the reduced TTI (#m in this case) of the DL CCs 2 and 3 is fed back at a general TTI #n+2 corresponding to the reduced #m+4. Furthermore, the user terminal can receive the DL signal based on the A/N after 4×reduced TTI (a reduced TTI #m+8 in this case).

Consequently, by applying the reduced processing time to at least one DL carrier configured to the user terminal in the case 1, it is possible to obtain the latency reduction effect without limiting the coverage of uplink or the maximum value of Timing Advance (TA) that is significantly influenced by the TTI length.

<Second Case>

The second case assumes that CA (DL-CA) is performed on a plurality of DL carriers, and CA (UL-CA) is also performed on UL carriers. For example, the second case corresponds to a case where a plurality of cells (referred to as CCs or carriers) are configured to DL transmission and a plurality of cells are configured to UL transmission, too. In this regard, the number of cells configured to DL transmission may be different from the number of cells configured to UL transmission (e.g., the number of cells for DL transmission is configured larger than the number of cells of UL transmission).

Figure 8:
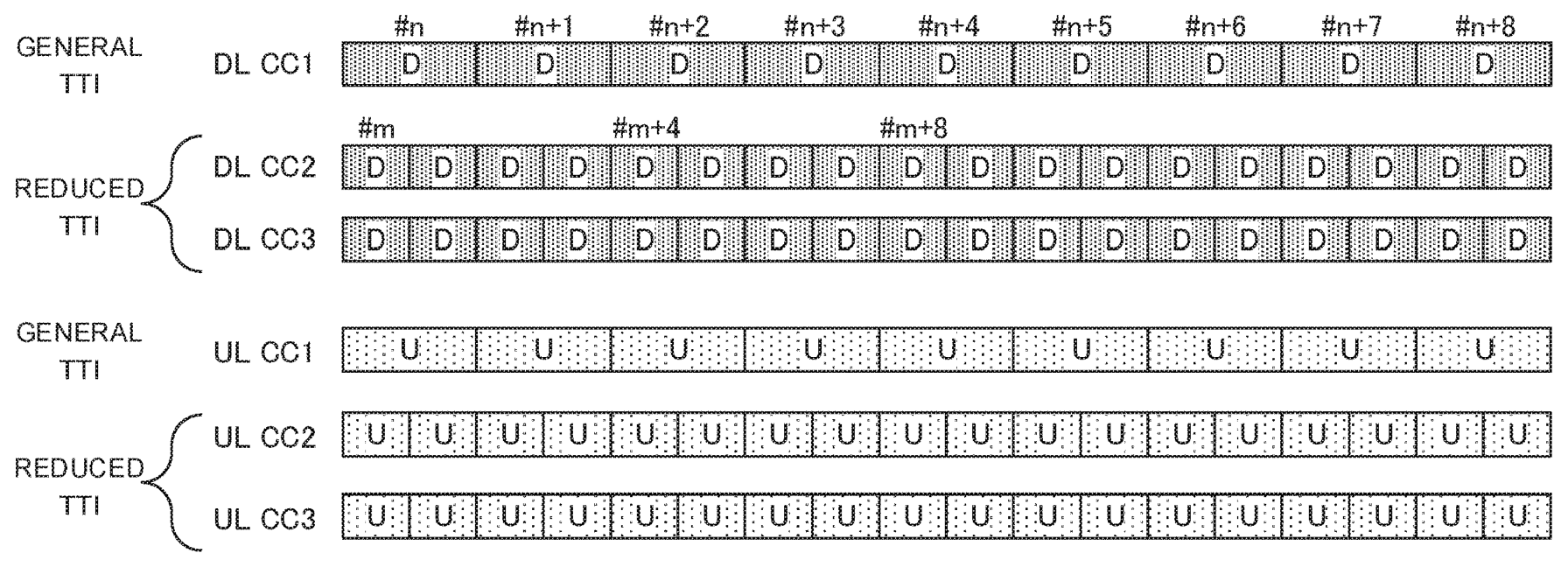

In this case, the user terminal applies the reduced TTI to a combination of optional numbers of DL carriers and UL carriers. For example, the user terminal selects a combination of predetermined DL carriers and UL carriers based on predetermined conditions, and controls transmission and reception (FIG. 8). FIG. 8 illustrates that the reduced TTI is applied to the predetermined DL carriers (DL CCs 2 and 3 in this case) and UL carriers (UL CCs 2 and 3). In this case, higher layer signaling (or physical layer signaling) of configuring the reduced TTI to the user terminal can be signaling of indicating DL-CCs and/or UL-CCs and configuring the reduced TTI. The user terminal configures the reduced TTI based on indices of the DL-CCs and/or UL-CCs to which the signaling has been configured.

The predetermined conditions can be determined based on the cell indices of the DL carriers and/or the UL carriers. It is possible to apply the reduced TTI to the DL carriers and the UL carriers of the same cell index. Alternatively, a combination of DL carriers and UL carriers to which the reduced TTI is applied may be determined based on information transmitted from the radio base station.

Furthermore, the user terminal may perform such control that the reduced TTI can be configured only to DL carriers for a cell (CC) of a certain index, yet the reduced TTI is not configured only to UL carriers. The certain index may be, for example, an index 0.

Furthermore, when the reduced processing time is configured to a plurality of UL carriers, a plurality of UL carriers may belong to the identical Cell Group (CG) and/or the same Timing Advance Group (TAG). In FIG. 8, the user terminal can control signal transmission and reception assuming that the UL CCs 2 and 3 belong to the identical CG and/or TAG.

Consequently, by applying the reduced TTI to the combination of the predetermined DL carriers and UL carriers configured to the user terminal in the case 2, it is possible to flexibly realize the latency reduction effect by using the reduced TTI and high frequency use efficiency by using the general TTI.

(Radio Communication System)

The configuration of the radio communication system according to the present embodiment will be described below. This radio communication system is applied the radio communication method according to each of the above embodiments. In this regard, the radio communication method according to each of the above embodiments may be applied alone or may be applied in combination.

Figure 9:
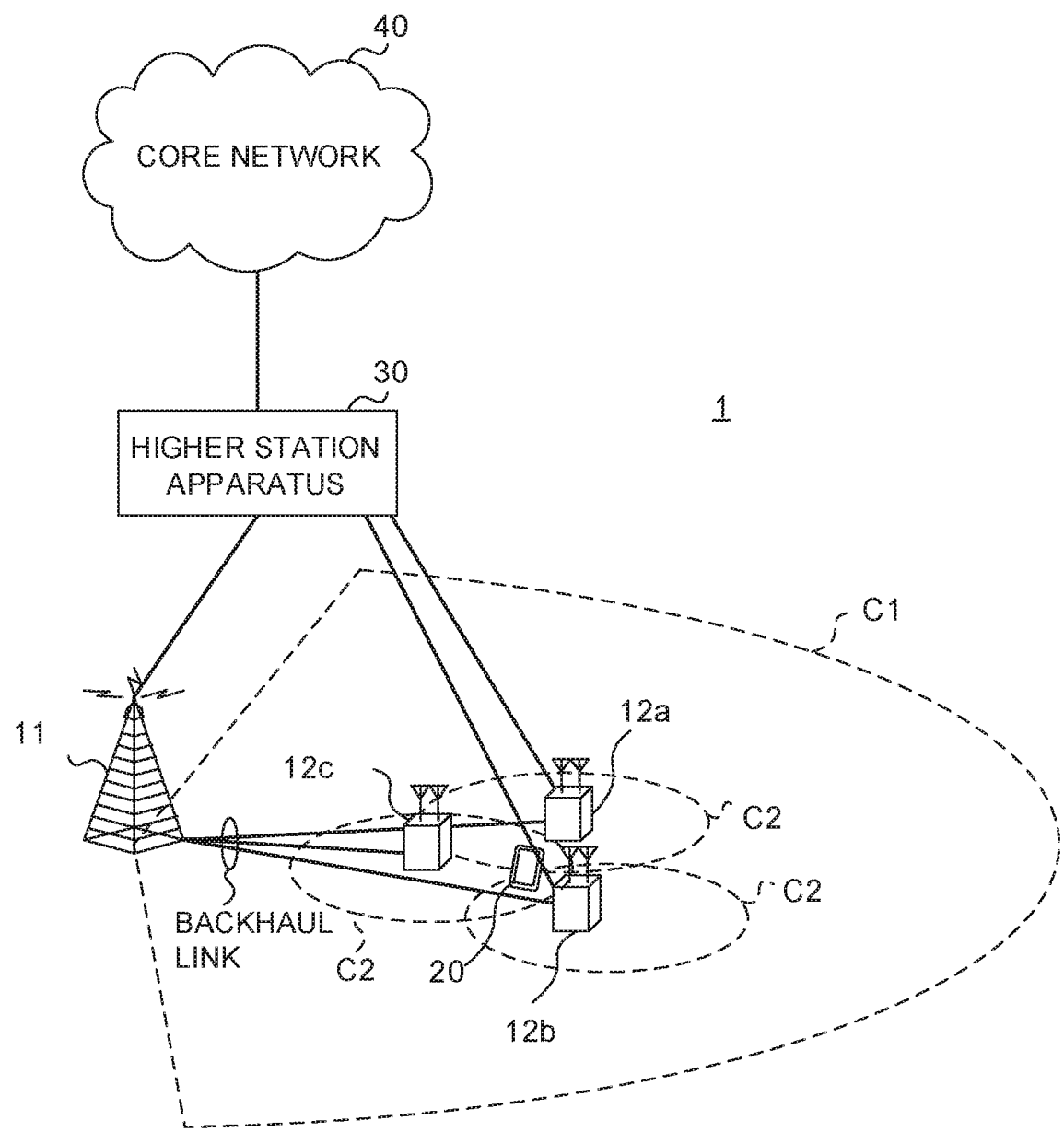
FIG. 9 is a diagram illustrating one example of a schematic configuration of a radio communication system according to the present embodiment.

FIG. 9 is a diagram illustrating one example of a schematic configuration of the radio communication system according to the present embodiment. A radio communication system 1 can apply Carrier Aggregation (CA) that aggregates a plurality of base frequency blocks (component carriers (CCs)) whose one unit is a system bandwidth (e.g., 20 MHz) of the LTE system, and/or Dual Connectivity (DC) that uses a plurality of Cell Groups (CGs) including one or more CCs. In this regard, the radio communication system 1 may be referred to as SUPER 3G, LTE-Advanced (LTE-A), IMT-Advanced, 4G, 5G. Future Radio Access (FRA) and New Radio Access Technology (New-RAT (NR)).

The radio communication system 1 illustrated in FIG. 9 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. A different numerology may be configured to be applied between cells and/or in each cell.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two or more CCs). Furthermore, the user terminal can use licensed band CCs and unlicensed band CCs as a plurality of cells.

Furthermore, the user terminal 20 can perform communication by using Time Division Duplex (TDD) or Frequency Division Duplex (FDD) in each cell. A TDD cell and an FDD cell may be referred to as a TDD carrier (frame configuration type 2) and an FDD carrier (frame configuration type 1), respectively.

Furthermore, each cell (carrier) may be applied a single numerology or may be applied a plurality of different numerologies. In this regard, the numerology refers to a parameter in a frequency direction and a time direction such as a sub-carrier spacing, a symbol length, a cyclic prefix length and a subframe length.

The user terminal 20 and the radio base station 11 can communicate by using a carrier (referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are respectively connected with a higher station apparatus 30 and are connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal but also a fixed communication terminal. Furthermore, the user terminal 20 can perform Device To Device (D2D) communication with the other user terminals 20.

The radio communication system 1 applies Orthogonal Frequency-Division Multiple Access (OFDMA) to Down-Link (DL) and Single Carrier Frequency Division Multiple Access (SC-FDMA) to UpLink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an interference between the terminals. In this regard, uplink and downlink radio access schemes are not limited to a combination of these, and OFDMA may be used on UL.

The radio communication system 1 uses a DL shared channel (also referred to as a PDSCH: Physical Downlink Shared Channel or a DL data channel) shared by each user terminal 20, a broadcast channel (PBCH: Physical Broadcast Channel) and an L1/L2 control channel as DL channels. User data, higher layer control information and System Information Blocks (SIB) are transmitted on the PDSCH. Furthermore, Master Information Blocks (MIB) are transmitted on the PBCH.

The L1/L2 control channel includes a DL control channel (a Physical Downlink Control Channel (PDCCH) and an Enhanced Physical Downlink Control Channel (EPDCCH)), a Physical Control Format Indicator Channel (PCFICH) and a Physical Hybrid-ARQ Indicator Channel (PHICH). Downlink Control Information (DCI) including scheduling information of the PDSCH and the PUSCH is transmitted on the PDCCH. The number of OFDM symbols used for the PDCCH is transmitted on the PCFICH. The EPDCCH is subjected to frequency division multiplexing with the PDSCH and is used to transmit DCI similar to the PDCCH. Retransmission control information (e.g., at least one of A/N, an NDI, an HPN or a Redundancy Version (RV)) of a UL signal (e.g., PUSCH) can be transmitted on at least one of the PHICH, the PDCCH and the EPDCCH.

The radio communication system 1 uses a UL shared channel (also referred to as a PUSCH: Physical Uplink Shared Channel and a UL data channel) shared by each user terminal 20, a UL control channel (PUCCH: Physical Uplink Control Channel), and a random access channel (PRACH: Physical Random Access Channel) as UL channels. User data and higher layer control information are transmitted on the PUSCH. Uplink Control Information (UCI) including at least one of retransmission control information (e.g., A/N) of a DL signal (e.g., PDSCH). Channel State Information (CSI) and a Scheduling Request (SR) is transmitted on the PUSCH or a PUCCH. A random access preamble for establishing connection with cells is transmitted on the PRACH.

<Radio Base Station>

Figure 10:
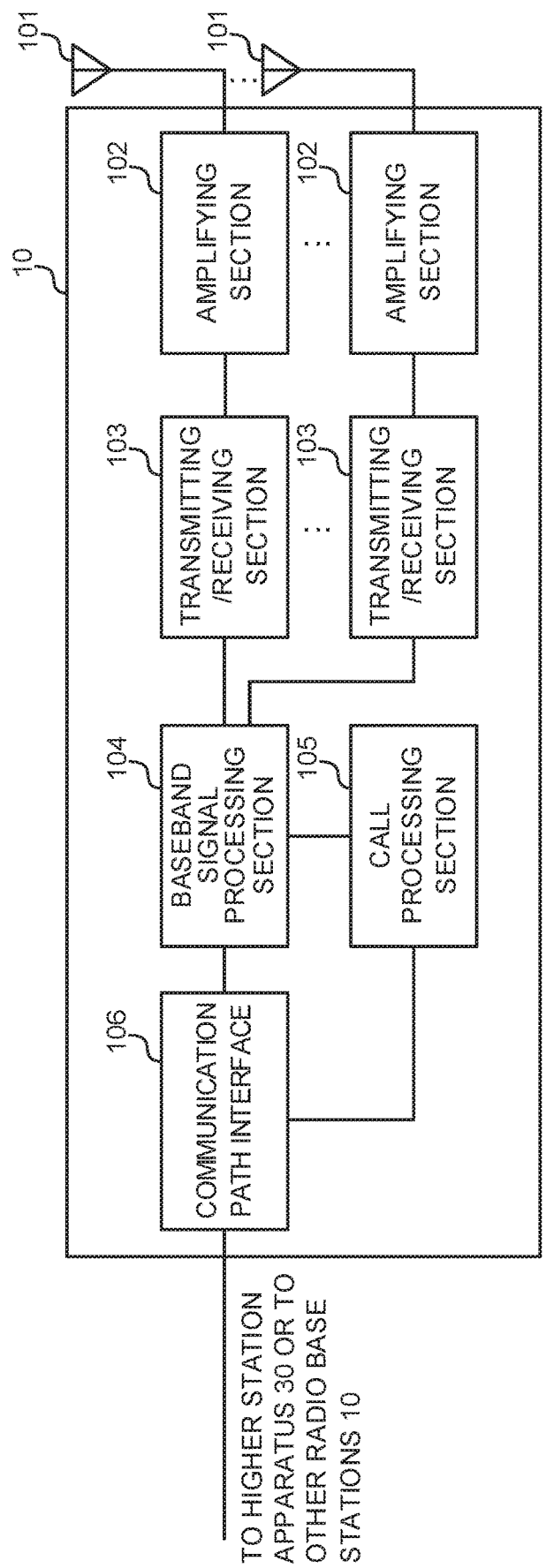
FIG. 10 is a diagram illustrating one example of an overall configuration of a radio base station according to the present embodiment.

FIG. 10 is a diagram illustrating one example of an overall configuration of the radio base station according to the present embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (such as HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a DL control signal, too, and transfers the DL control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101.

The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

On the other hand, each amplifying section 102 amplifies a radio frequency signal as a UL signal received by each transmission/reception antenna 101. Each transmission/reception section 103 receives the UL signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing. Inverse Discrete Fourier Transform (IDFT) processing, error correcting decoding, reception processing of MAC retransmission control, and reception processing of an RLC layer and a PDCP layer on UL data included in the input UL signal, and transfers the UL data to the higher station apparatus 30 via the channel interface 106. The call processing section 105 performs call processing such as a configuration and release of a communication channel, state management of the radio base station 10, and radio resource management.

The channel interface 106 transmits and receives signals to and from the higher station apparatus 30 via a predetermined interface. Furthermore, the channel interface 106 may transmit and receive (backhaul signaling) signals to and from the neighbor radio base station 10 via an inter-base station interface (e.g., optical fibers compliant with the Common Public Radio Interface (CPRI) or the X2 interface).

Furthermore, each transmission/reception section 103 transmits DL DCI (also referred to as a DL assignment) for scheduling the DL shared channel (e.g., PDSCH), and the DL shared channel. Furthermore, each transmission/reception section 103 may transmit at least one (or a combination) of information indicating the reference value k of a transmission timing of the radio base station 10 and/or the user terminal 20, information related to the reduced TTI and information related to cells (DL CCs and UL CCs) used for communication.

Figure 11:
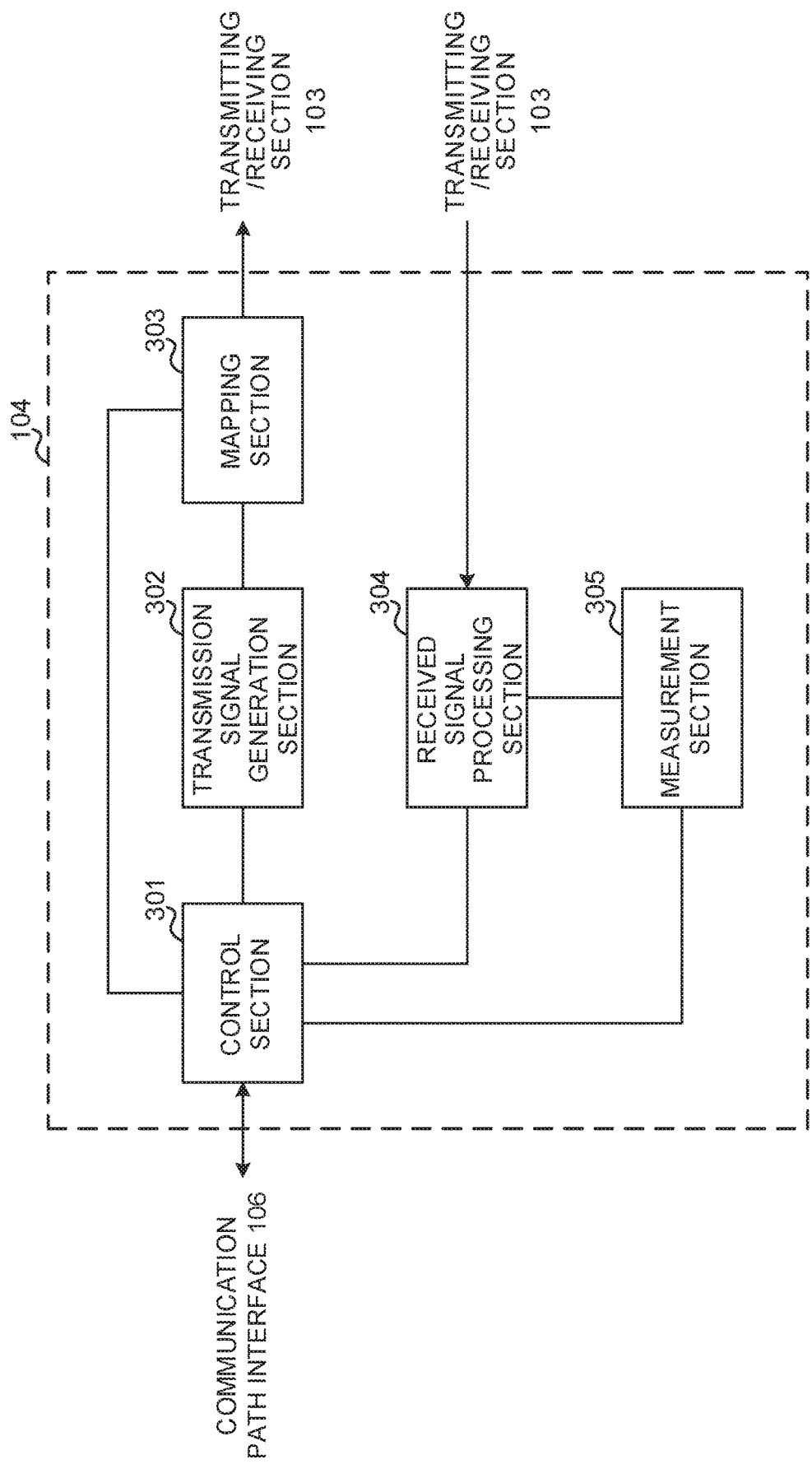
FIG. 11 is a diagram illustrating one example of a function configuration of the radio base station according to the present embodiment.

FIG. 11 is a diagram illustrating one example of a function configuration of the radio base station according to the present embodiment. In addition, FIG. 11 mainly illustrates function blocks of characteristic portions according to the present embodiment, and assumes that the radio base station 10 includes other function blocks, too, that are necessary for radio communication. As illustrated in FIG. 11, the baseband signal processing section 104 includes a control section 301, a transmission signal generating section 302, a mapping section 303, a received signal processing section 304 and a measurement section 305.

The control section 301 controls the entire radio base station 10. The control section 301 controls, for example, DL signal generation of the transmission signal generating section 302, DL signal mapping of the mapping section 303, UL signal reception processing (e.g., demodulation) of the received signal processing section 304, and measurement of the measurement section 305.

More specifically, the control section 301 schedules the user terminal 20. For example, the control section 301 schedules the PUSCH and/or the PDSCH for the user terminal 20.

Furthermore, the control section 301 controls a signal transmission/reception timing (predetermined timing) based on at least the number of cells used for (configured to) UL transmission or whether or not a plurality of cells are used for (whether or not CA and/or DC are applied to) UL transmission.

For example, when configuring a plurality of cells (applying Carrier Aggregation (CA)) to DL transmission and configuring a single cell (not applying CA) to UL transmission, the control section 301 can apply the reduced processing time to all cells used for DL transmission and UL transmission (see FIG. 4). Furthermore, when using a plurality of cells for (applying CA to) DL transmission and UL transmission, the control section 301 may apply the reduced processing time to at least one DL transmission cell and at least one UL transmission cell (see FIG. 5).

Furthermore, when using a plurality of cells for (applying CA to) DL transmission and using a single cell for (not applying CA to) UL transmission, the control section 301 can apply the reduced TTI to at least one DL transmission cell (see FIGS. 6 and 7). Furthermore, when using a plurality of cells for (applying CA to) DL transmission and UL transmission, the control section 301 can apply the reduced processing time to a combination of predetermined DL transmission cells and UL transmission cells (see FIG. 8).

Furthermore, the control section 301 may control retransmission of the PDSCH based on retransmission control information from the user terminal 20. Furthermore, the control section 301 may control a retransmission timing of the PDSCH based on the reference value k and the reduced TTI.

The control section 301 can be composed of a controller, a control circuit or a control apparatus described based on the common knowledge in the technical field according to the present invention.

The transmission signal generating section 302 generates DL signals (including DL data, DCI, retransmission control information of UL data and higher layer control information) based on an instruction from the control section 301, and outputs the DL signals to the mapping section 303.

The transmission signal generating section 302 can be composed of a signal generator, a signal generating circuit or a signal generating apparatus described based on the common knowledge in the technical field according to the present invention.

The mapping section 303 maps the DL signal (e.g., DL data. DCI, retransmission control information of UL data and higher layer control information) generated by the transmission signal generating section 302, on a predetermined radio resource based on the instruction from the control section 301, and outputs the DL signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a UL signal (e.g., UL data or UCI) transmitted from the user terminal 20. More specifically, the received signal processing section 304 performs reception processing on the UL signal based on the numerology configured to the user terminal 20. Furthermore, the received signal processing section 304 may output the received signal and the signal after the reception processing to the measurement section 305. Furthermore, the received signal processing section 304 performs reception processing on A/N of the DL signal, and outputs ACK or NACK to the control section 301.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure UL channel quality based on, for example, received power (e.g., Reference Signal Received Power (RSRP)) and/or received quality (e.g., Reference Signal Received Quality (RSRQ)) of a UL reference signal. The measurement section 305 may output a measurement result to the control section 301.

<User Terminal>

Figure 12:
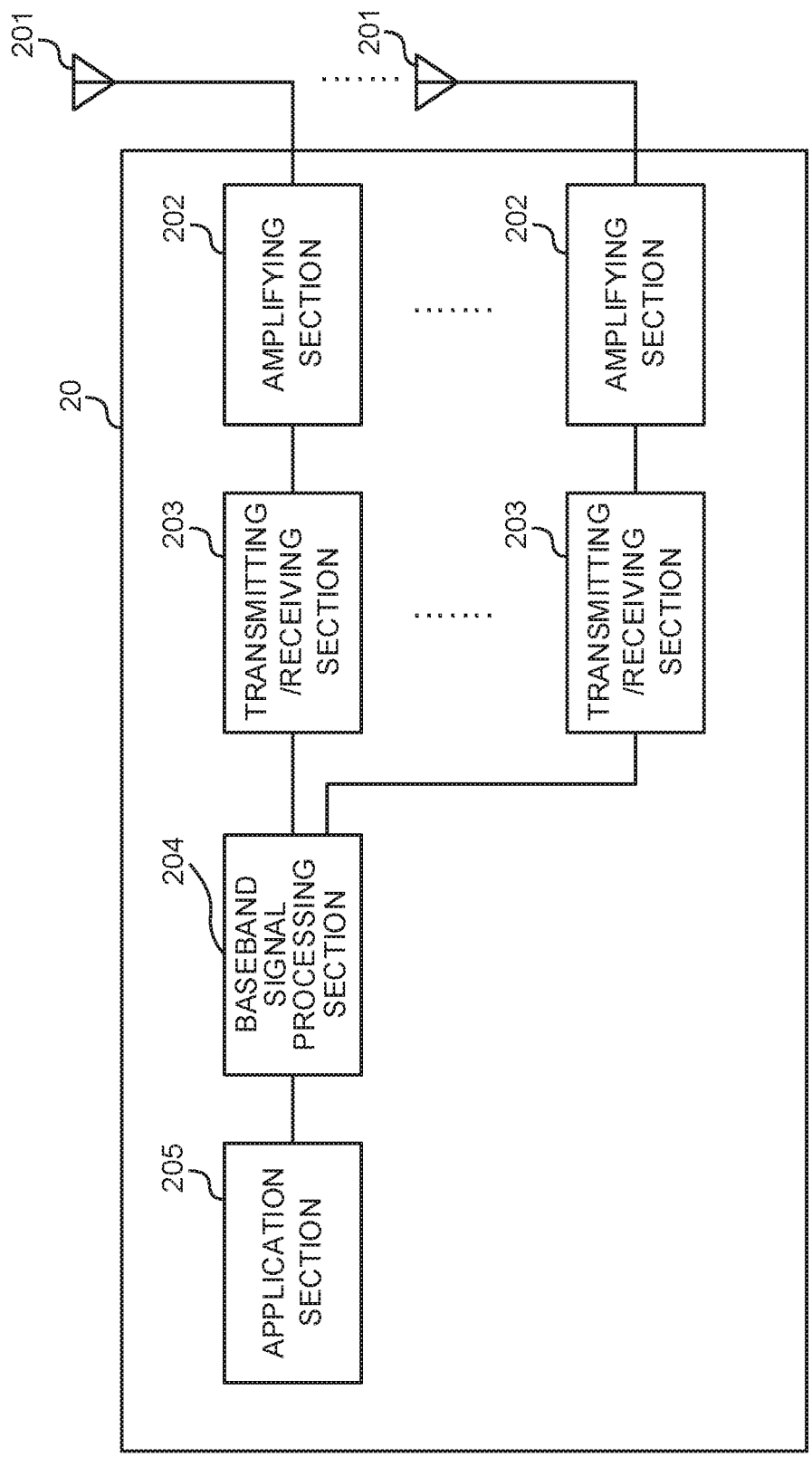
FIG. 12 is a diagram illustrating one example of an overall configuration of a user terminal according to the present embodiment.

FIG. 12 is a diagram illustrating one example of an overall configuration of the user terminal according to the present embodiment. The user terminal 20 includes pluralities of transmission/reception antennas 201 for MIMO transmission, amplifying sections 202 and transmission/reception sections 203, a baseband signal processing section 204 and an application section 205.

The amplifying sections 202 amplify radio frequency signals received at a plurality of transmission/reception antennas 201, respectively. Each transmission/reception section 203 receives a DL signal amplified by each amplifying section 202. Each transmission/reception section 203 performs frequency conversion on the received signal into a baseband signal, and outputs the baseband signal to the baseband signal processing section 204.

The baseband signal processing section 204 performs FFT processing, error correcting decoding, and reception processing of retransmission control on the input baseband signal. The baseband signal processing section 204 transfers DL data to the application section 205. The application section 205 performs processing related to layers higher than a physical layer and an MAC layer. Furthermore, the baseband signal processing section 204 may transfer broadcast information, too, to the application section 205.

On the other hand, the application section 205 inputs UL data to the baseband signal processing section 204. The baseband signal processing section 204 performs transmission processing of retransmission control (e.g., HARQ transmission processing), channel coding, rate matching, puncturing, Discrete Fourier Transform (DFT) processing and IFFT processing on the UL data, and transfers the UL data to each transmission/reception section 203. The baseband signal processing section 204 performs channel coding, rate matching, puncturing, DFT processing and IFFT processing on the UCI (e.g., at least one of DL retransmission control information, CSI and an SR), too, and transfers the UCI to each transmission/reception section 203.

Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 receives the DL DCI (also referred to as the DL assignment) for scheduling the DL shared channel (e.g., PDSCH), and the DL shared channel. Furthermore, each transmission/reception section 203 transmits retransmission control information of the DL shared channel according to an instruction of the control section 401.

Furthermore, each transmission/reception section 203 receives the DL DCI (also referred to as the DL assignment) for scheduling the DL shared channel (e.g., PDSCH), and the DL shared channel. Furthermore, each transmission/reception section transmits the UL signal at a predetermined timing based on the DL signal. Furthermore, each transmission/reception section 203 may receive at least one (or a combination) of the information indicating the reference value k of the transmission timing of the radio base station 10 and/or the user terminal 20, the information related to the reduced TTI and the information related to cells (DL CCs and UL CCs) used for communication.

The transmission/reception sections 203 can be composed of transmitters/receivers, transmission/reception circuits or transmission/reception apparatuses described based on the common knowledge in the technical field according to the present invention. Furthermore, the transmission/reception sections 203 may be composed as an integrated transmission/reception section or may be composed of transmission sections and reception sections.

Figure 13:
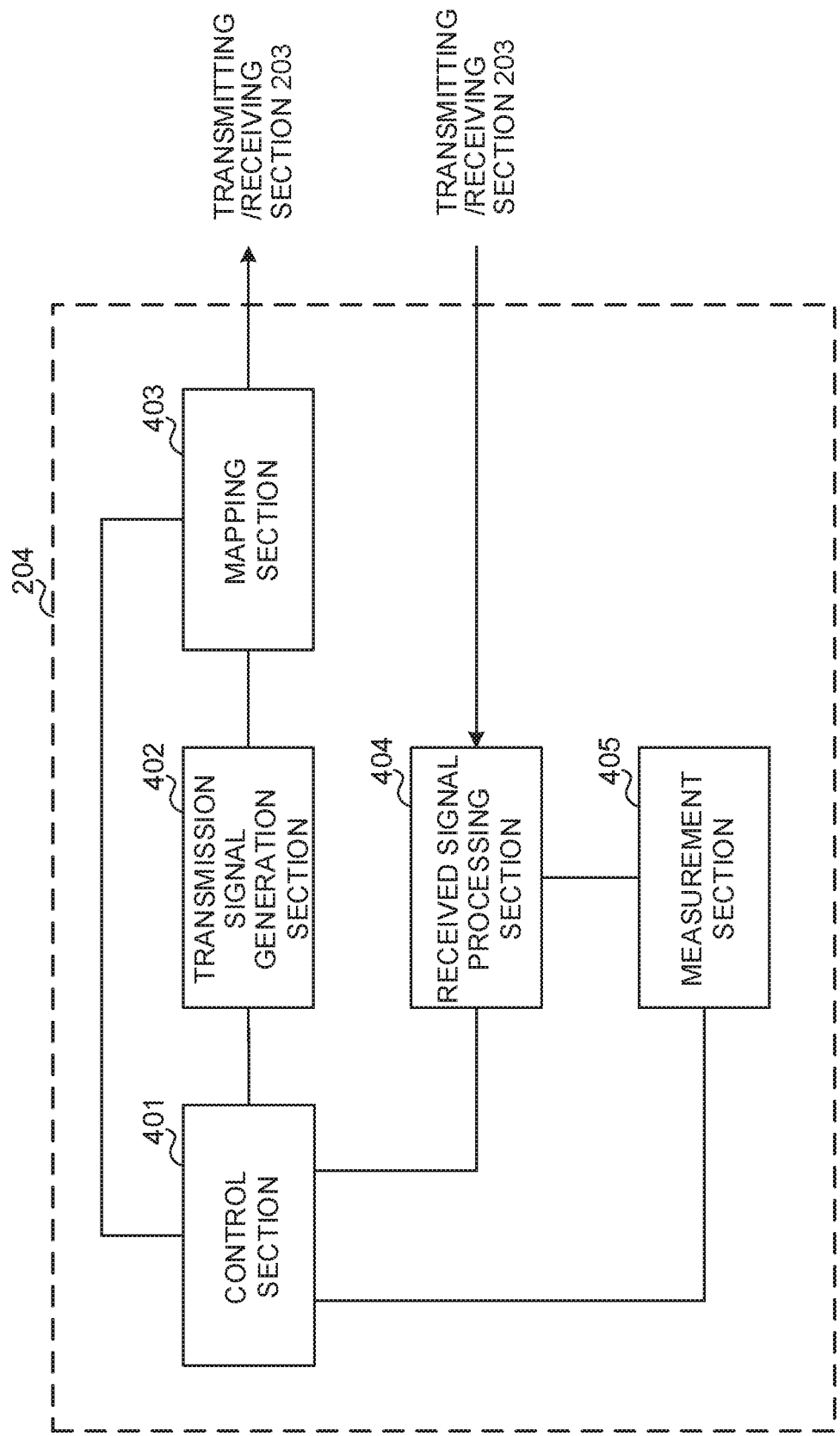
FIG. 13 is a diagram illustrating one example of a function configuration of the user terminal according to the present embodiment.

FIG. 13 is a diagram illustrating one example of a function configuration of the user terminal according to the present embodiment. In addition, FIG. 13 mainly illustrates function blocks of characteristic portions according to the present embodiment, and assumes that the user terminal 20 includes other function blocks, too, that are necessary for radio communication. As illustrated in FIG. 13, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls, for example, UL signal generation of the transmission signal generating section 402, UL signal mapping of the mapping section 403, DL signal reception processing of the received signal processing section 404, and measurement of the measurement section 405.

Furthermore, the control section 401 controls a signal transmission/reception timing (predetermined timing) based on at least the number of cells used for (configured to) UL transmission or whether or not a plurality of cells are used for (whether or not CA and/DC are applied to) UL transmission.

When, for example, configuring a plurality of cells to (applying Carrier Aggregation (CA) to) DL transmission and configuring a single cell to (not applying CA to) UL transmission, the control section 401 can apply the reduced processing time to all cells used for DL transmission and UL transmission (see FIG. 4). Furthermore, when using a plurality of cells for (applying CA to) DL transmission and UL transmission, the control section 401 may apply the reduced processing time to at least one DL transmission cell and at least one UL transmission cell (see FIG. 5).

Furthermore, when using a plurality of cells for (applying CA to) DL transmission and using a single cell for (not applying CA to) UL transmission, the control section 401 can apply the reduced TTI to at least one DL transmission cell (see FIGS. 6 and 7). Furthermore, when using a plurality of cells for (applying CA to) DL transmission and UL transmission, the control section 401 can apply the reduced processing time to a combination of predetermined DL transmission cells and UL transmission cells (see FIG. 8).

The control section 401 can be composed of a controller, a control circuit or a control apparatus described based on the common knowledge in the technical field according to the present invention.

The transmission signal generating section 402 generates (e.g., encodes, rate-matches, punctures and modulates) a UL signal (including UL data, UCI and a UL reference signal) based on an instruction from the control section 401, and outputs the UL signal to the mapping section 403. The transmission signal generating section 402 can be composed of a signal generator, a signal generating circuit or a signal generating apparatus described based on the common knowledge in the technical field according to the present invention.

The mapping section 403 maps the UL signal generated by the transmission signal generating section 402, on a radio resource based on the instruction from the control section 401, and outputs the UL signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signal (DL data, DCI or higher layer control information). The received signal processing section 404 outputs information received from the radio base station 10 to the control section 401. The received signal processing section 404 outputs, for example, broadcast information, system information, higher layer control information of higher layer signaling such as RRC signaling, and physical layer control information (L1/L2 control information) to the control section 401.

The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The measurement section 405 measures a channel state based on a reference signal (e.g., a CRS or/and a CSI-RS) from the radio base station 10, and outputs a measurement result to the control section 401.

The measurement section 405 can be composed of a signal processor, a signal processing circuit or a signal processing apparatus, and a measurement instrument, a measurement circuit or a measurement apparatus described based on the common knowledge in the technical field according to the present invention.

<Hardware Configuration>

In addition, the block diagrams used to describe the above embodiments illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of these apparatuses formed by connecting two or more physically and/or logically separate apparatuses directly and/or indirectly (by way of, for example, wired connection and/or radio connection).

Figure 14:
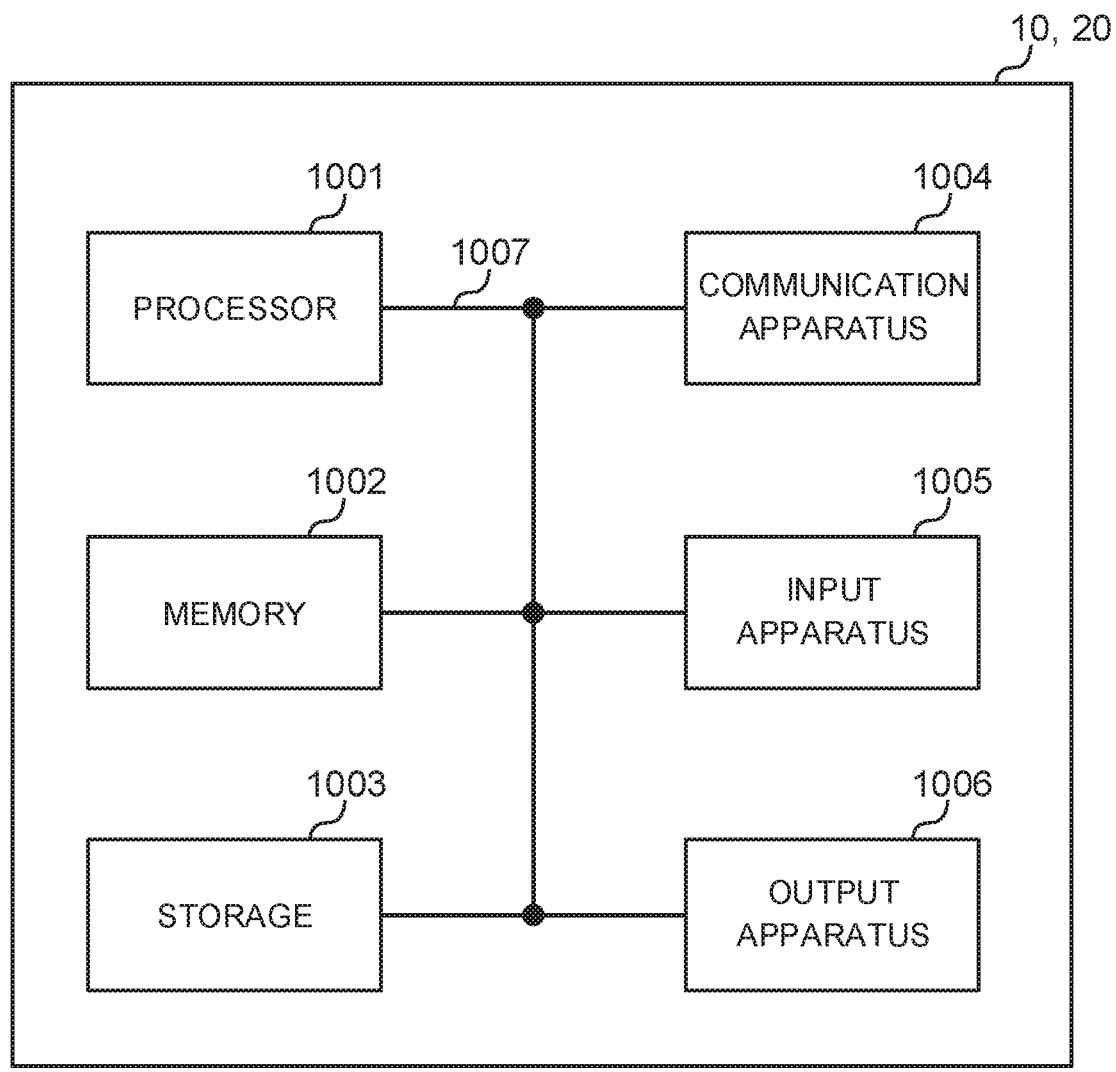
FIG. 14 is a diagram illustrating one example of hardware configurations of the radio base station and the user terminal according to the present embodiment.

For example, the radio base station and the user terminal according to the one embodiment of the present invention may function as computers that perform processing of the radio communication method according to the present invention. FIG. 14 is a diagram illustrating one example of hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 14 or may be configured without including part of the apparatuses.

For example, FIG. 14 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read predetermined software (program), and thereby causing the processor 1001 to perform an operation, and control communication of the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example. Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed of a single bus or may be composed of buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

Modified Example

In addition, each term that is described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed time duration (e.g., one ms) that does not depend on the numerology.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology. Furthermore, the slot may include a plurality of mini slots. Each mini slot may include one or a plurality of symbols in the time domain. Furthermore, the mini slot may be referred to as a subslot.

The radio frame, the subframe, the slot, the mini slot and the symbol each indicate a time unit for transmitting signals. The other corresponding names may be used for the radio frame, the subframe, the slot, the mini slot and the symbol. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (one ms) according to legacy LTE, may be a period (e.g., 1 to 13 symbols) shorter than one ms or may be a period longer than one ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), a code block and/or a codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of one ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding one ms, and the short TTI (e.g., the reduced TTI) may be read as a TTI having a TTI length less than the TTI length of the long TTI and equal to or more than one ms.

Resource Blocks (RBs) are resource block allocation units of the time domain and the frequency domain, and may include one or a plurality of contiguous subcarriers in the frequency domain. Furthermore, the RB may include one or a plurality of symbols in the time domain or may have the length of one slot, one mini slot, one subframe or one TTI. One TTI or one subframe may be each composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots included in a subframe or a radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to predetermined values or may be expressed by other corresponding information. For example, a radio resource may be indicated by a predetermined index. Furthermore, numerical expressions that use these parameters may be different from those explicitly disclosed in this description.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The input and output information and signals can be overwritten, updated or additionally written. The output information and signals may be deleted. The input information and signals may be transmitted to other apparatuses.

Notification of information is not limited to the aspects/embodiments described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIB) and System Information Blocks (SIB)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by, for example, an MAC Control Element (MAC CE).

Furthermore, notification of predetermined information (e.g., notification of "being X") may be made not only explicitly but also implicitly (by, for example, not notifying this predetermined information or by notifying another information). Decision may be performed based on a value (0 or 1) expressed by one bit, may be performed based on a boolean expressed by true or false or may be performed by comparing numerical values (e.g., comparison with a predetermined value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)". "radio base station", "eNB", "gNB", "cell". "sector". "cell group". "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G). Future Radio Access (FRA). New Radio Access Technology (New-RAT), New Radio (NR). New radio access (NX), Future generation radio access (FX), Global System for Mobile communications (GSM) (registered trademark), CDMA2000. Ultra Mobile Broadband (UMB), IEEE 802.11 (Wi-Fi (registered trademark)), IEEE 802.16 (WiMAX (registered trademark)), IEEE 802.20. Ultra-WideBand (UWB). Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating". "computing". "processing", "deriving", "investigating". "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information). "input". "output" and "accessing" (e.g., accessing data in a memory). Furthermore, "deciding (determining)" may be regarded to "decide (determine)" "resolving", "selecting", "choosing", "establishing" and "comparing". That is. "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access". It can be understood that, when used in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

When the words "including" and "comprising" and modifications of these words are used in this description and the claims, these words intend to be comprehensive similar to the word "having". Furthermore, the word "or" used in this description and the claims intends not to be an exclusive OR.

The present invention has been described in detail above. However, it is obvious for a person skilled in the art that the present invention is not limited to the embodiments described in this description. The present invention can be carried out as modified and changed aspects without departing from the gist and the scope of the present invention defined by the recitation of the claims. Accordingly, the disclosure of this description intends for exemplary explanation, and does not have any restrictive meaning to the present invention.

This application claims priority to Japanese Patent Application No. 2016-216718 filed on Nov. 4, 2016, the entire contents of which are incorporated by reference herein.

The invention claimed is:

1. A terminal comprising:
a receiver that receives an information transmitted from a base station, the information including a transmission time interval (TTI) configuration; and
a processor that, when performing communication using a plurality of cells, determines a combination of cells in which a short TTI is applied based on the information transmitted including the TTI configuration,
wherein the processor determines a reference value for a transmission timing of an uplink (UL) signal based on an information for configuring a short processing time from a reception of a downlink (DL) signal to a transmission of the UL signal based on the DL signal, and
wherein, when the short processing time is configured, the reference value for the transmission timing of the UL signal is 3 ms or less.

2. The terminal according to claim 1, wherein the processor controls communication assuming that a plurality of cells to which a short processing time is configured belong to a same cell group.

3. A radio communication method for a terminal, comprising:
receiving information transmitted from a base station, the information including a transmission time interval (TTI) configuration; and
when performing communication using a plurality of cells, determining a combination of cells to which a short TTI is applied based on the information including the TTI configuration,
wherein determining a reference value for a transmission timing of an uplink (UL) signal based on an information for configuring a short processing time from a reception of a downlink (DL) signal to a transmission of the UL signal based on the DL signal, and
wherein, when the short processing time is configured, the reference value for the transmission timing of the UL signal is 3 ms or less.

4. A base station comprising:
a transmitter that transmits information for configuring a short transmission time interval (TTI) to a terminal, the information including a TTI configuration related to the short TTI; and
a processor that, when performing communication using a plurality of cells, determines a combination of cells in which the short TTI is applied based on the TTI configuration,
wherein the processor determines a reference value for a transmission timing of an uplink (UL) signal based on an information for configuring a short processing time from a transmission of a downlink (DL) signal to a reception of the UL signal based on the DL signal, and
wherein, when the short processing time is configured, the reference value for the receiving timing of the UL signal is 3 ms or less.

5. A system comprising a terminal and a base station, wherein:
the terminal comprises:
a receiver that receives an information transmitted from the base station, the information including a transmission time interval (TTI) configuration; and
a processor that, when performing communication using a plurality of cells, determines a combination of cells in which a short TTI is applied based on the information transmitted including the TTI configuration,
wherein the processor determines a reference value for a transmission timing of an uplink (UL) signal based on an information for configuring a short processing time from a reception of a downlink (DL) signal to a transmission of the UL signal based on the DL signal, and
wherein, when the short processing time is configured, the reference value for the transmission timing of the UL signal is 3 ms or less, and
the base station comprises:
a transmitter that transmits information including the TTI configuration.

* * * * *